US012650733B2

(12) United States Patent
Jain et al.

(10) Patent No.: US 12,650,733 B2
(45) Date of Patent: Jun. 9, 2026

(54) GESTURE-BASED LOAD CONTROL

(71) Applicant: Lutron Technology Company LLC, Coopersburg, PA (US)

(72) Inventors: Soumya Jain, Allentown, PA (US); Michael J. Zizza, Bethlehem, PA (US); John Nill, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/313,536

(22) Filed: May 8, 2023

(65) Prior Publication Data

US 2023/0280836 A1 Sep. 7, 2023

Related U.S. Application Data

(63) Continuation of application No. 17/378,315, filed on Jul. 16, 2021, now Pat. No. 11,669,169, which is a
(Continued)

(51) Int. Cl.
| | |
|---|---|
| *G06F 3/01* | (2006.01) |
| *G05B 15/02* | (2006.01) |
| *G06T 7/20* | (2017.01) |
| *G06T 7/73* | (2017.01) |
| *H04N 13/204* | (2018.01) |
| *H04N 23/95* | (2023.01) |
| *H04N 23/20* | (2023.01) |

(52) U.S. Cl.
CPC ............. *G06F 3/017* (2013.01); *G05B 15/02* (2013.01); *G06T 7/20* (2013.01); *G06T 7/73* (2017.01);
(Continued)

(58) Field of Classification Search
CPC ........... G06F 3/017; G05B 15/02; G06T 7/20; G06T 7/73; H04N 5/33; H04N 13/204; H04N 23/00
See application file for complete search history.

(56) References Cited

U.S. PATENT DOCUMENTS

| | | |
|---|---|---|
| 7,940,167 B2 | 5/2011 | Steiner et al. |
| 8,009,042 B2 | 8/2011 | Steiner et al. |

(Continued)

OTHER PUBLICATIONS

Bourgeous, Mike, "Gesture Like Light Control with Kinect", Available at: https://www.youtube.com/watch?=x99gHQKVcg, retrieved on Jul. 8, 2013, Transcript of Video, May 15, 2011, 2 pages.
(Continued)

*Primary Examiner* — Adam R. Giesy
(74) *Attorney, Agent, or Firm* — Michael S. Czarnecki; Glen R. Farbanish; Philip N. Smith

(57) ABSTRACT
A load control system may include load control devices for controlling an amount of power provided to an electrical load. The load control devices may be capable of controlling the amount of power provided to the electrical load based on control instructions received from a gesture-based control device. The gesture-based control device may identify gestures performed by a user for controlling a load control device and provide control instructions to the load control device based on the identified gestures. The gestures may be identified based on images received from a motion capture device. A gesture may be associated with a scene that includes a configuration of one or more load control devices in a load control system. The user may perform one or more gestures to program the gesture-based control device to identify a gesture.

15 Claims, 22 Drawing Sheets

Related U.S. Application Data continuation of application No. 16/571,699, filed on Sep. 16, 2019, now Pat. No. 11,068,066, which is a continuation of application No. 16/152,385, filed on Oct. 4, 2018, now Pat. No. 10,452,153, which is a continuation of application No. 15/225,042, filed on Aug. 1, 2016, now Pat. No. 10,095,314, which is a continuation of application No. 13/835,594, filed on Mar. 15, 2013, now Pat. No. 9,430,044.

(52) U.S. Cl.
CPC .......... *H04N 13/204* (2018.05); *H04N 23/95* (2023.01); *H04N 23/20* (2023.01)

(56) References Cited

U.S. PATENT DOCUMENTS

| | | | |
|---|---|---|---|
| 8,199,010 | B2 | 6/2012 | Sloan et al. |
| 8,228,184 | B2 | 7/2012 | Blakeley et al. |
| 8,773,512 | B1 | 7/2014 | Rafi |
| 8,933,876 | B2 | 1/2015 | Galor et al. |
| 9,201,499 | B1 | 12/2015 | Chang et al. |
| 2011/0007142 | A1 | 1/2011 | Perez et al. |
| 2012/0268374 | A1 | 10/2012 | Heald |
| 2013/0010207 | A1* | 1/2013 | Valik ..................... G06F 3/0304 |
| | | | 704/E21.001 |
| 2013/0154951 | A1 | 6/2013 | Laibowitz et al. |
| 2013/0234625 | A1 | 9/2013 | Kondo et al. |
| 2014/0266669 | A1* | 9/2014 | Fadell ..................... H04W 4/80 |
| | | | 340/501 |
| 2014/0317577 | A1 | 10/2014 | Chen et al. |
| 2015/0279051 | A1 | 10/2015 | Kovesi et al. |

OTHER PUBLICATIONS

Bourgeous, Mike, "Gesture Like Light Control with Kinect", Available at: https://www.youtube.com/watch?=x99gHQKVcg, retrieved on Jul. 8, 2013, Video, May 15, 2011.

* cited by examiner

902

906

910

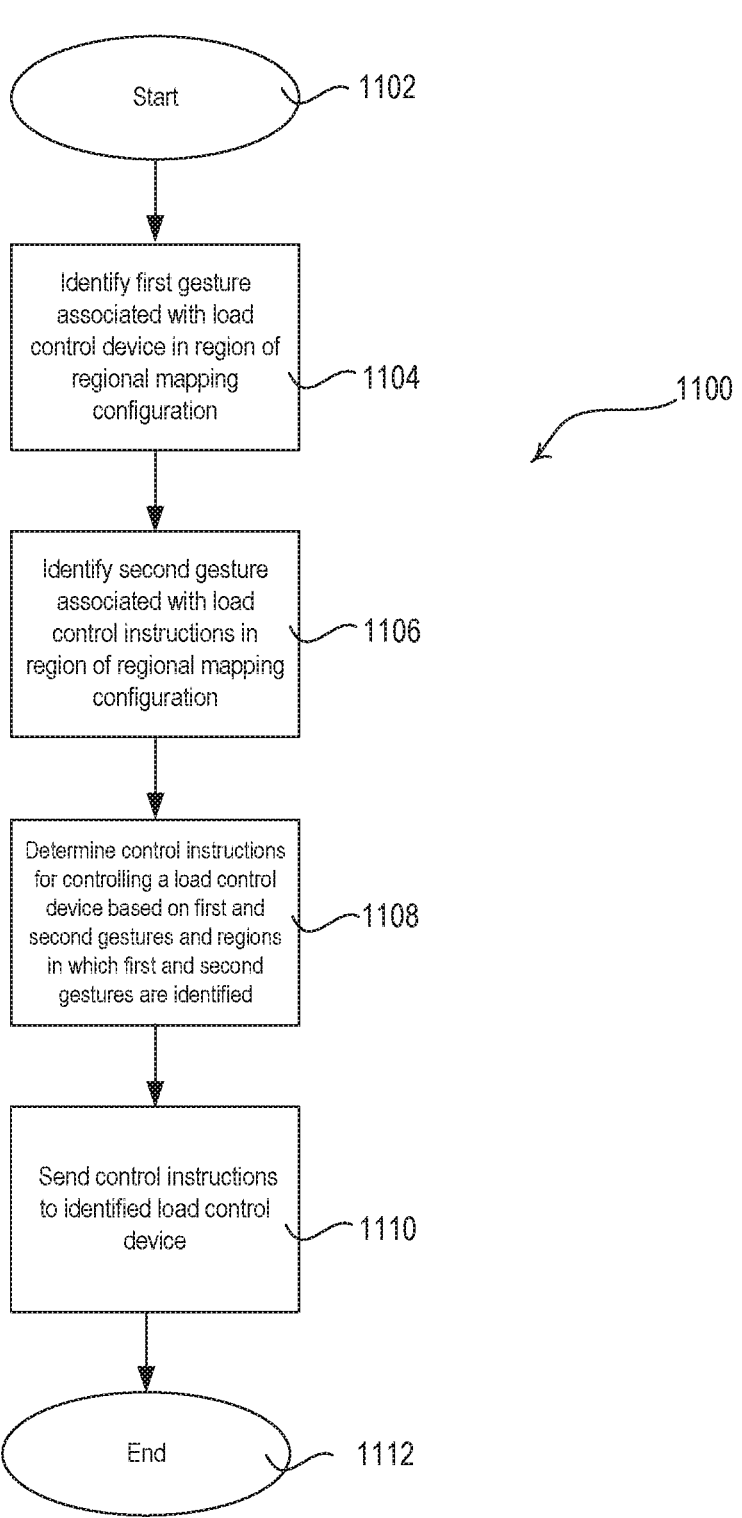

1102 Start

1104 Identify first gesture associated with load control device in region of regional mapping configuration 1106 Identify second gesture associated with load control instructions in region of regional mapping configuration 1108 Determine control instructions for controlling a load control device based on first and second gestures and regions in which first and second gestures are identified 1110 Send control instructions to identified load control device 1112 End

GESTURE-BASED LOAD CONTROL

CROSS REFERENCE

This application is a continuation of U.S. patent application Ser. No. 17/378,315, filed Jul. 16, 2021; which is a continuation of U.S. patent application Ser. No. 16/571,699 filed Sep. 16, 2019, now U.S. Pat. No. 11,068,066 issued Jul. 20, 2021; which is a continuation of U.S. patent application Ser. No. 16/152,385, filed Oct. 4, 2018, now U.S. Pat. No. 10,452,153 issued Oct. 22, 2019; which is a continuation of U.S. patent application Ser. No. 15/225,042, filed Aug. 1, 2016, now U.S. Pat. No. 10,095,314, issued Oct. 9, 2018; which is a continuation of U.S. patent application Ser. No. 13/835,594, filed Mar. 15, 2013, now U.S. Pat. No. 9,430, 044 issued on Aug. 30, 2016, the contents of each of which are hereby incorporated by reference herein in their entireties.

BACKGROUND

A user environment, such as a residence or an office building for example, may be configured using various types of load control systems. Load control systems may include lighting systems, motorized window treatment systems, heating, ventilation, and air-conditioning (HVAC) systems, or the like. Most load control systems require the use of various devices for performing load control. Such load control systems may be embodied in a two-part load control system that includes a controllable device for directly controlling the electrical load and a control device, such as a remote control, for indirectly controlling the electrical load by sending instructions to the controllable device. Using such load control systems, a user may indirectly control an electrical load using a control device.

FIG. 1 illustrates an example of a prior art load control environment 102. As shown in FIG. 1, the load control environment 102 may include controllable devices and control devices. The controllable devices may include a lighting control device 104 (e.g., a dimmer switch, a ballast, or a light-emitting diode (LED) driver) for directly controlling an amount of power provided to lighting load 106, a motorized window treatment 112 for controlling the position of covering material 114, a thermostat 120 for controlling an HVAC system, and an alternating-current (AC) plug-in load control device 122 for controlling the amount of power provided to a floor lamp 124, table lamp, or the electrical load of another device that is plugged in to the AC plug-in load control device 122. The control devices in the load control environment 102 may include remote control device 116, a daylight sensor 108, and/or an occupancy sensor 110. The remote control device 116 may communicate with load control devices via a wired or wireless communication. The remote control device 116 may include a wireless switch, a wireless dimmer, a cellular phone, a tablet, or other wireless remote control device.

The control devices in the load control system depicted in FIG. 1 may provide convenient ways for the user 118 to control an electrical load. These load control systems, however, require the user 118 to keep track of one or more devices for controlling the system. A user's control may also be limited due to a predefined interface or the limited instructions provided by the control device.

Gesture recognition is a developing technology, which is being considered for use in load control systems. Gesture recognition may enable a user of an electronic device to send instructions to a load control device without the use of a remote control or a similar control device. Instead, an electronic device may capture an image of a user and recognize a user's command by identifying a gesture indicated by the user in the image. The electronic device may recognize the user's gesture by identifying one or more predefined locations on the user's body and determining a predefined configuration of those points that indicates a user command. Once the user command is determined, the electronic device may send instructions to a device capable of carrying out the command.

FIG. 2 illustrates an example of a prior art example of a load control environment 202 for gesture-based load control. As shown in FIG. 2, a computer device 210 may be configured by a user 208 to recognize a gesture performed by the user 208 and determine load control instructions based on the performed gesture. The user 208 may configure the computer device 210 to recognize a region 212 around a lamp 204. A digital camera 214 may track the user 208 and identify when the user 208 is in proximity to the region 212. The user 208 may raise and lower an arm along a base 206 of the lamp 204 to control the power supplied to the lamp 204. The user 208 may configure the computer device 210 to recognize these gestures within the region 202 and instruct the lamp 204 to increase and decrease the power supplied to the lamp 204 when the user 208 raises and lowers an arm. When the user 208 raises an arm along the base 206 of the lamp 204, the power supplied to the lamp 204 may increase. When the user 208 lowers an arm along the base 206 of the lamp 204, the power supplied to the lamp 204 may decrease.

While load control systems are being developed that may allow for controlling devices using gesture-like movements, the current systems are still inconvenient to use. The current systems are experimental and may have to be entirely configured by the user. The current systems lack features that would make them commercially viable. There are also many challenges associated with developing a gesture-based load control system that have not been addressed by current systems.

SUMMARY

A load control system may include load control devices for controlling an amount of power provided to an electrical load. As disclosed herein, load control devices may be capable of controlling the amount of power provided to the electrical load based on control instructions received from a gesture-based control device. The control instructions may include load control instructions or another indication that causes the load control device to determine load control instructions for controlling an electrical load. The gesture-based control device may identify gestures performed by a user for controlling a load control device and provide control instructions to the load control device based on the identified gestures.

The gestures may be identified by analyzing images (e.g., still-frame images and/or video) of the user performing the gestures. The images may be generated by a motion capture device. The motion capture device, or the functionality thereof, may be included in a load control device, a device controlled by the load control device, and/or a gesture-based control device. The gesture-based control device may determine a skeletal outline of the user, and one or more coordinates thereon, for identifying a gesture performed by the user. The gesture-based control device may identify the gesture by comparing the coordinates on the skeletal outline with the coordinates of one or more established gestures on the gesture-based control device.

A gesture may be associated with a load control device and/or control instructions for controlling a load control device. A user may indicate a load control device for being controlled by performing an associated gesture. For example, the user may indicate a ballast for being controlled by pointing to the ballast or the ballast's lighting fixture. When the load control device has been determined, the user may indicate the control instructions for controlling the load control device by performing an associated gesture. For example, the user may raise an arm to send instructions to the identified ballast to increase the power provided to the lighting fixture.

A gesture may be associated with a scene that includes a configuration of one or more load control devices in a load control system. To configure the load control devices according to the scene, the user may perform the associated gesture. The gesture may indicate the load control devices for being controlled and the control instructions for being sent to each load control device.

Regional mapping configurations and vectors may be used to identify load control devices and/or control instructions. A regional mapping configuration may include a configuration of one or more regions of a user environment. The regional mapping configuration may include one or more partitions that divide an image of a user and/or user environment into multiple regions. Each region may be associated with a load control device and/or control instructions. The gesture-based control device may identify a gesture performed by the user that indicates a region in the regional mapping configuration and determine the associated load control device and/or control instructions. The gesture-based control device may also identify a load control device indicated by a user by following a vector from one or more coordinates on a user's skeletal outline. The vector may point to the load control device, for example.

The user may engage and disengage the gesture-based control device by performing an engage gesture and a disengage gesture, respectively. The engage gesture may enable the gesture-based control device to identify one or more load control gestures performed by the user. The disengage gesture may cause the gesture-based control device to be unable to identify control instructions and/or to control a load control device until the user re-engages the gesture-based control device.

The user may perform one or more gestures to program the gesture-based control device to identify a gesture. The user may perform a programming gesture that may be identified by the gesture-based control device to trigger a programming mode. When the gesture-based control device is in programming mode, the user may program the gesture-based control device to identify a gesture. The user may perform a gesture and associate that gesture with a region in a regional mapping configuration, a load control device, or control instructions. The gesture-based control device may store the association such that the gesture may be identified for load control or control of the gesture-based control device.

BRIEF DESCRIPTION OF THE DRAWINGS

FIG. 11 is a simplified flow diagram depicting an example method for gesture-based load control using a regional mapping configuration.

DETAILED DESCRIPTION

Figure 1:
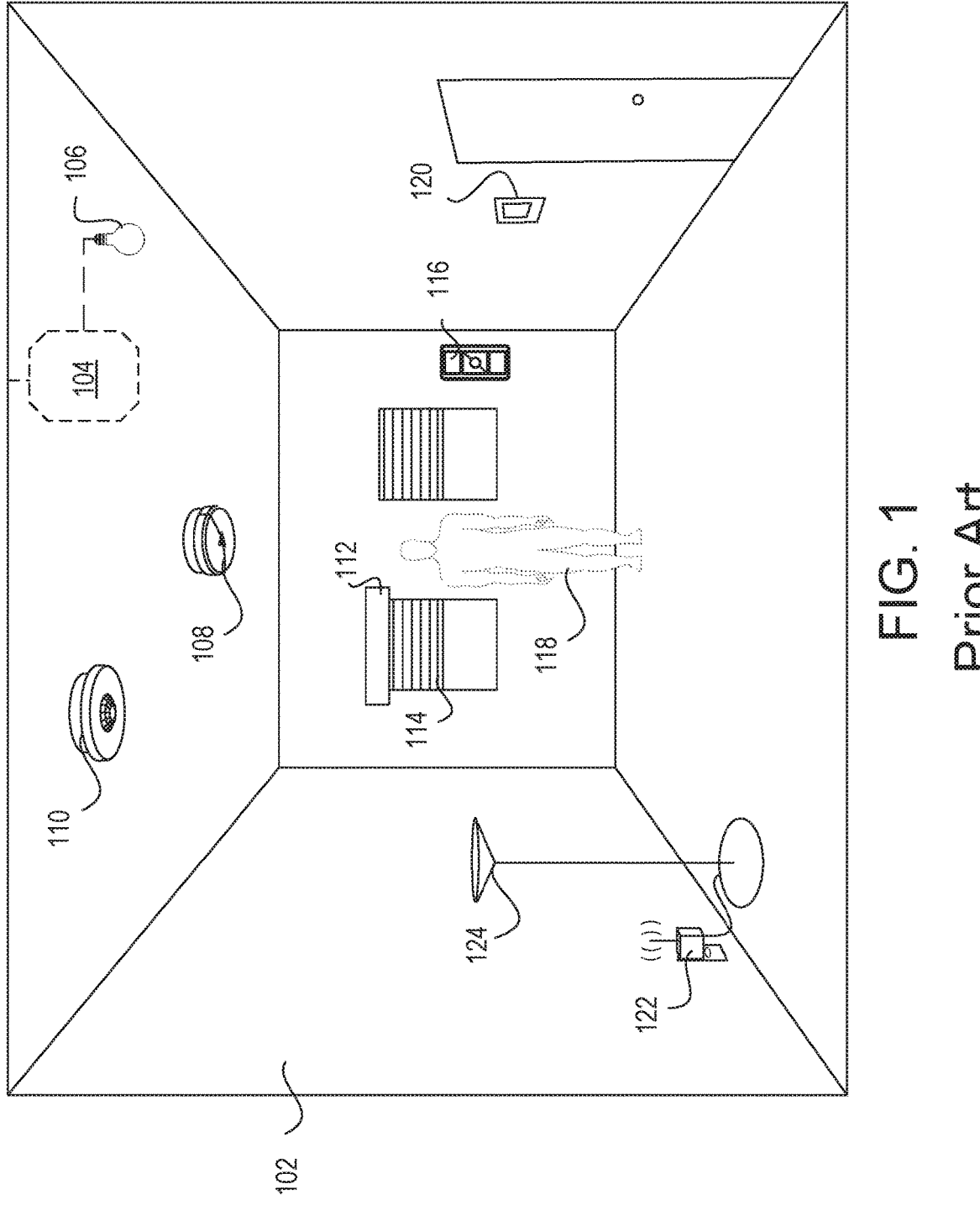
FIG. 1 depicts an example prior art environment for controlling an electrical load.
Figure 2:
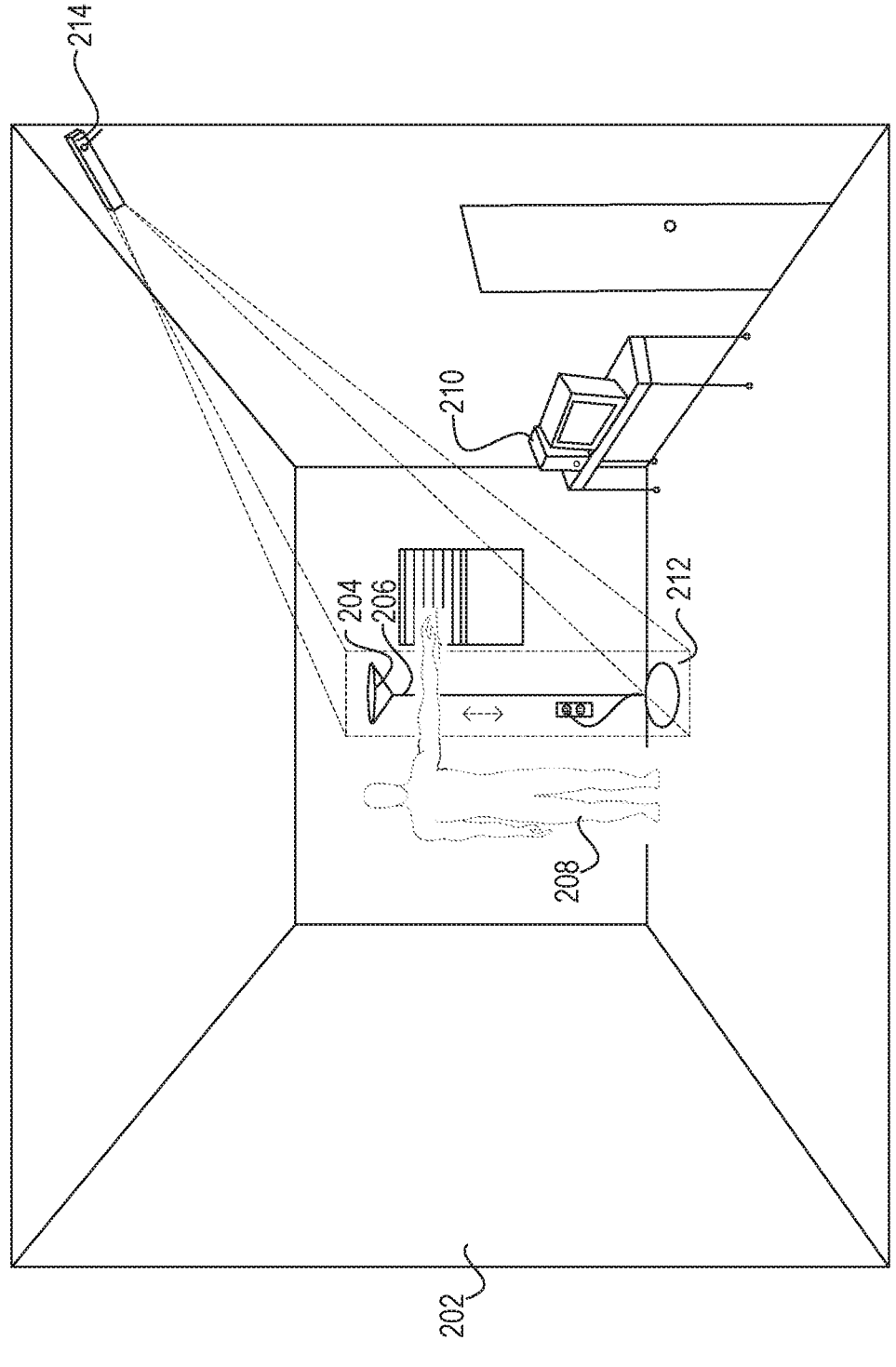
FIG. 2 depicts an example prior art environment for gesture-based load control.
Figure 3:
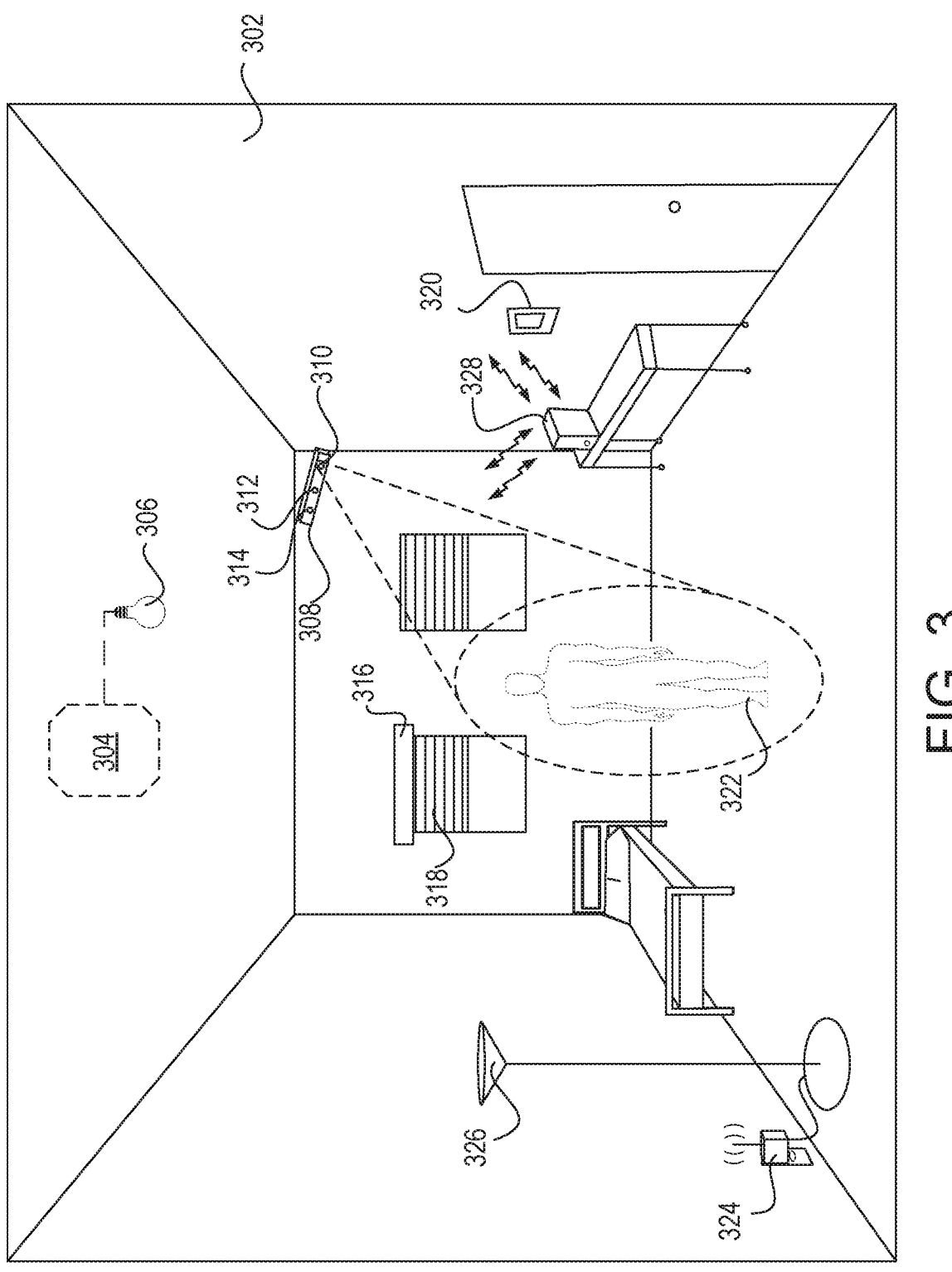
FIG. 3 depicts an example environment for controlling devices using gesture control.

FIG. 3 depicts an example load control environment for controlling devices using gesture control. As shown in FIG. 3, the load control environment 302 may be installed with one or more load control devices for controlling the electrical loads within a room or building. Each load control device may be capable of controlling the amount of power provided to an electrical load. A load control device may be a controllable device capable of directly controlling an amount of power provided to an electrical load. Example load control devices may include a lighting control device 304 (e.g., a dimmer switch, a switching device, a ballast, or an LED driver) for controlling the amount of power provided to a lighting fixture 306, a motorized window treatment 316 for controlling the position of a covering material 318, a thermostat 320 for controlling an heating, ventilation, and air-conditioning (HVAC) system, and/or an AC plug-in load control device 324 for controlling the amount of power provided to a lamp (e.g., a floor lamp 326 or a table lamp) or the electrical load of another device that is plugged in to the AC plug-in load control device 324.

Each of the load control devices may control the amount of power provided to an electrical load based on control instructions received from a gesture-based control device 328. The control instructions may include load control instructions or another indication that causes the load control device to determine load control instructions for controlling an electrical load. The gesture-based control device 328 may indirectly control the amount of power provided to an electrical load by providing the control instructions to a controllable device. The gesture-based control device 328 may communicate with the load control devices via wired or wireless communications. The gesture-based control device 328 may send the instructions for controlling a load control device based on one or more gestures performed by user 322.

The gesture-based control device 328 may identify the user 322 and/or gestures performed by user 322 using a motion capture device 308. The motion capture device 308 may include any device capable of capturing images (e.g., still-frame images and/or videos). The motion capture device 308 may include a digital camera 310, an infrared (IR) camera 314, and/or a depth sensor 312 for generating images of the gestures performed by user 322. The digital camera 310 may generate images of the user 322 using visible light. The IR camera 314 may generate images of the user 322 using IR radiation. The depth sensor 312 may be used to capture the three-dimensional (3D) aspects of the images. The depth sensor 312 may include an IR laser that may detect a distance of an object from the motion capture device 308. The motion capture device 308 may also include an RGB camera for capturing images using three basic color components (red, green, and blue) and/or one or more microphones for capturing audio. The RGB camera may be used for facial recognition. The microphones may capture audio for voice recognition or determining control instructions.

The motion capture device 308, or the functionality thereof, may be included in another device. The functionality of the motion capture device 308 may be included in a load control device, such as the lighting control device 304, the motorized window treatment 316, the AC plug-in load control device 324, and/or thermostat 320. The functionality of the motion capture device 308 may be included in a device controlled by the load control device, such as the lighting load 306, the covering material 318, and/or the floor lamp 326. The functionality of the motion capture device 308 may be included in the gesture-based control device 328.

The gesture-based control device 328 may identify the user 322 based on the images received from the motion capture device 308. The gesture-based control device 328 may obtain x, y coordinates or x, y, z coordinates of one or more locations on the user 322. The gesture-based control device 328 may determine that the user 322 is a human based on the one or more identified coordinates on the user 322. The coordinates of the user 322 may be compared generally to an outline of a human to determine that the user 322 is a human. The user coordinates may be identified throughout the body of the user 322, or one or more sections of the user 322. For example, the user coordinates may be identified in the user 322 from the waist up to identify the user 322 when the user 322 is sitting down.

The gesture-based control device 328 may identify a gesture being indicated by the user 322 based on the images generated by the motion capture device 308. The gesture may be indicated by the user 322 holding a position for a period of time to indicate a command and/or by the user 322 performing one or more bodily movements that indicate a command. The gesture-based control device 328 may identify one or more coordinates on the user 322 and determine from the coordinates whether the user 322 is signaling a recognized command. The gesture-based control device 328 may identify the gesture by comparing the position or the movements of the user 322 with one or more pre-defined gestures stored on the gesture-based control device 328. Each recognized gesture may be associated with one or more load control devices and/or one or more control instructions for controlling load control devices.

To engage the gesture-based control device 328 for identifying load control commands, the user 322 may perform an engage gesture. The engage gesture may be captured by the motion capture device 308 and may be identified by the gesture-based control device 328 to put the gesture-based control device 328 in a load control mode for controlling one or more load control devices based on an identified gesture performed by the user 322. The motion capture device 308 and/or gesture-based control device 328 may indicate to the user 322 that the gesture-based control device 328 is engaged. For example, the motion capture device 308 and/or gesture-based control device 328 may flash an indicator light after the gesture-based control device 328 is engaged. The gesture-based control device 328 may indicate that it is engaged by sending instructions to a load control device. For example, gesture-based control device 328 may instruct the lighting control device 304 to flash the lighting load 306, instruct the motorized window treatment 316 to change the position of covering material 318 (e.g., jog the covering material 318 up or down a predetermined amount, wiggle the covering material 318, or tilt the covering material 318), and/or instruct the AC plug-in load control device 324 to flash the floor lamp 326.

The engaged gesture-based control device 328 may identify one or more gestures performed by user 322. The period of time for which the gesture-based control device 328 is engaged may be a pre-determined period of time or until the user 322 disengages the gesture-based control device 328. The user 322 may re-engage the gesture-based control device 328 after each identified gesture or the user 322 may perform consecutive gestures for a period of time without re-engaging the gesture-based control device 328. The user 322 may disengage the gesture-based control device 328 by performing a disengage gesture that may cause the gesture-based control device 328 to be unable to control a load control device until the user 322 re-engages the gesture-based control device 328.

The user 322 may perform one or more gestures to indicate a load control device and/or control instructions to be sent to a load control device. The user 322 may be indicate the load control device to which the gesture-based control device 328 may send the control instructions by pointing in the direction of the load control device, touching the load control device, placing a portion of the user 322's body in between the load control device and the motion capture device 308, or otherwise identifying the load control device that the user 322 would like to control. For example, the user 322 may perform a gesture to indicate the lighting control device 304 and to send load control instructions to the lighting control device 304 for controlling the lighting load 306.

In an example, the user 322 may perform a gesture to identify the load control device that the user 322 would like to control and perform another gesture to control the load control device. For example, the user 322 may point to the thermostat 320 to indicate the thermostat 320 as the load control device that the user 322 would like to control and the user 322 may point up to raise the temperature of the load control environment 302. The gesture-based control device 328 may identify the thermostat 320 from the user 322 pointing to the thermostat 320 and may instruct the thermostat 320 to increase the temperature in the load control environment 302 based on the user 322 pointing up. The temperature may be increased by a predetermined amount, such as one degree, for each time the user 322 points up. The temperature may be increased for each period of time, e.g., each second, the user 322 holds the gesture. The user 322 may identify the load control device with one arm and control the load with the other arm.

In another example, the gesture may identify the load control device that the user 322 would like to control and indicate the control instructions to be sent to the load control device. For example, the gesture-based control device 328 may identify a gesture performed by the user 322 that may cause the gesture-based control device 328 to identify the lighting control device 304, the AC plug-in load control device 324, and the motorized window treatment 316 and send control instructions to each of the devices 304, 324, 316 for controlling an amount of power provided to a corresponding electrical load. The user 322 may lower an arm to instruct the lighting control device 304 to decrease the power provided to the lighting load 306, instruct the AC plug-in load control device 324 to decrease the power provided to the floor lamp 326, and/or instruct the motorized window treatment 316 to lower the covering material 318.

The gesture-based control device 328 may distinguish between users. For example, the gesture-based control device 328 may use the coordinates of user 322 to distinguish the user 322 from other users that may have a different set of coordinates or body structure. The gesture-based control device 328 may distinguish between users based on facial recognition, gesture recognition, voice recognition, and/or the like. The facial recognition may be performed using images from an RGB camera on the motion capture device 308. The voice recognition may be performed based on one or more microphones on the motion capture device, on the gesture-based control device 328, on one or more load control devices, on one or more devices control by a load control device, and/or located elsewhere in the load control environment 302.

The gesture-based control device 328 may receive and identify audio commands for controlling load control devices using the one or more microphones. A microphone in the load control environment 302 may record audio or capture a live audio stream. The audio commands may be paired with gestures to determine a load control device and/or control instructions for controlling the load control device. For example, the user 322 may point to the lighting control device 304 and say "turn on" to command the lighting load control device to turn on the lighting load 306. The audio commands may also be used to identify the device. The user 322 may say "thermostat" to identify the thermostat 320 and may raise an arm to increase the temperature of the load control environment 302 using the thermostat.

Figure 4:
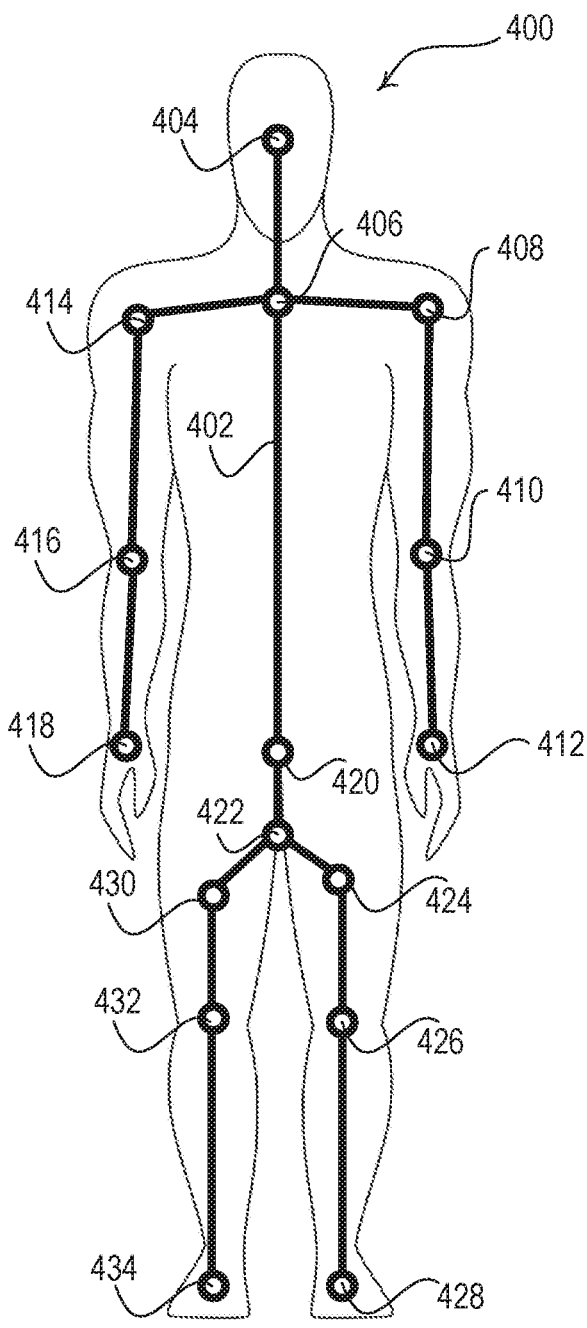
FIG. 4 is a diagram depicting example coordinates that may be analyzed on a user's body.

FIG. 4 is a diagram depicting example coordinates that may be analyzed on a user body 400. The coordinates may be determined at a gesture-based control device, such as the gesture-based control device 328, from images of the user body 400 that may be generated by a motion capture device, such as the motion capture device 308. The coordinates may be mapped to coordinates on a skeletal outline 402 of the user body 400. The skeletal outline 402 may be determined by measuring from the exterior surface of the user body 400. The skeletal outline 402 may be determined on a two-dimensional or three-dimensional plane. Each coordinate on the skeletal outline 402 may be an x,y coordinate in the two-dimensional plane or an x, y, z coordinate in the three-dimensional plane.

A user may be identified based on one or more coordinates on the skeletal outline 402. For example, the user may be identified based on a head coordinate 404, hand coordinates 412, 418, and feet coordinates 428, 434. The coordinates on the skeletal outline 402 may be determined based on their location within the user body 400 and/or their proximity to one or more other coordinates on the skeletal outline 402.

The head coordinate 404 may be identified by measuring to the center of the head of the user body 400. The head coordinate 404 may be located at the highest point on the skeletal outline 402. A left hand coordinate 412 and a right hand coordinate 418 may be located at the end of the arms of the skeletal outline 402. Each arm of the skeletal outline 402 may include a coordinate at each of the joints. The left arm may include a left elbow coordinate 410 and a left shoulder coordinate 408. The right arm may include a right elbow coordinate 416 and a right shoulder coordinate 414. The shoulder coordinates 408, 414 may be located at the top of the arms of the skeletal outline 402. The skeletal outline 402 may include a chest coordinate 406 located in between the shoulder coordinates 408, 414. A left foot coordinate 428 and a right foot coordinate 434 may be located at the end of the legs of the skeletal outline 402. The left leg of the skeletal outline 402 may include a left knee coordinate 426 and a left hip coordinate 424. The right leg of the skeletal outline may include a right knee coordinate 432 and a right hip coordinate 430. The hip coordinates 424, 430 may be located at the top of the legs of the skeletal outline 402. The skeletal outline 402 may include a hip center coordinate 422 located in between the hip coordinates 424, 430. A spinal coordinate 420 may be located on the spine of the skeletal outline 402.

The coordinates located at the joints of the skeletal outline 402 may be identified when the user moves at the corresponding joint. For example, the shoulder coordinates 408, 414, the elbow coordinates 410, 416, and the knee coordinates 426, 432 may be determined when the user body 400 moves at the corresponding joints. The skeletal outline 402 may include wrist and ankle coordinates (not shown) to identify movements or positions of the user body 400 using hands and feet. The skeletal outline 402 may include finger coordinates (not shown) to identify user gestures using fingers, such as pointing gestures, gestures indicating a direction, gestures indicating a number, or the like.

The coordinates may be analyzed to identify the user and/or identify a gesture indicated by the user. Each coordinate may be used to track a corresponding body part. The position or movement of the user body 400 may be identified based on the movement or position of one or more coordinates. The movement or position of each coordinate may be identified based on its relation to one or more other coordinates on the skeletal outline 402. For example, a user's left arm may be identified as raising laterally from the user's side when the left hand coordinate 412 and/or the left elbow coordinate 410 are identified as approaching a horizontal line from the shoulder coordinate 408. The position or movement of one or more identified coordinates may be compared to one or more established coordinates to identify a gesture being indicated by the user.

Each user may be identified based on the location of one or more coordinates. The distance between two coordinates on a user may be different than the distance between the coordinates on another user. For example, a taller user may have a larger distance between head coordinate 404 and feet coordinates 428, 434 than a shorter user when the two users are in a standing position. A user may be associated with a unique identifier that corresponds to the coordinates on the skeletal outline 402. Each skeletal outline 402 may be associated with a different unique identifier for identifying different users. Different gestures, commands, and/or control instructions may be associated with each user or user identifier.

Figure 5:
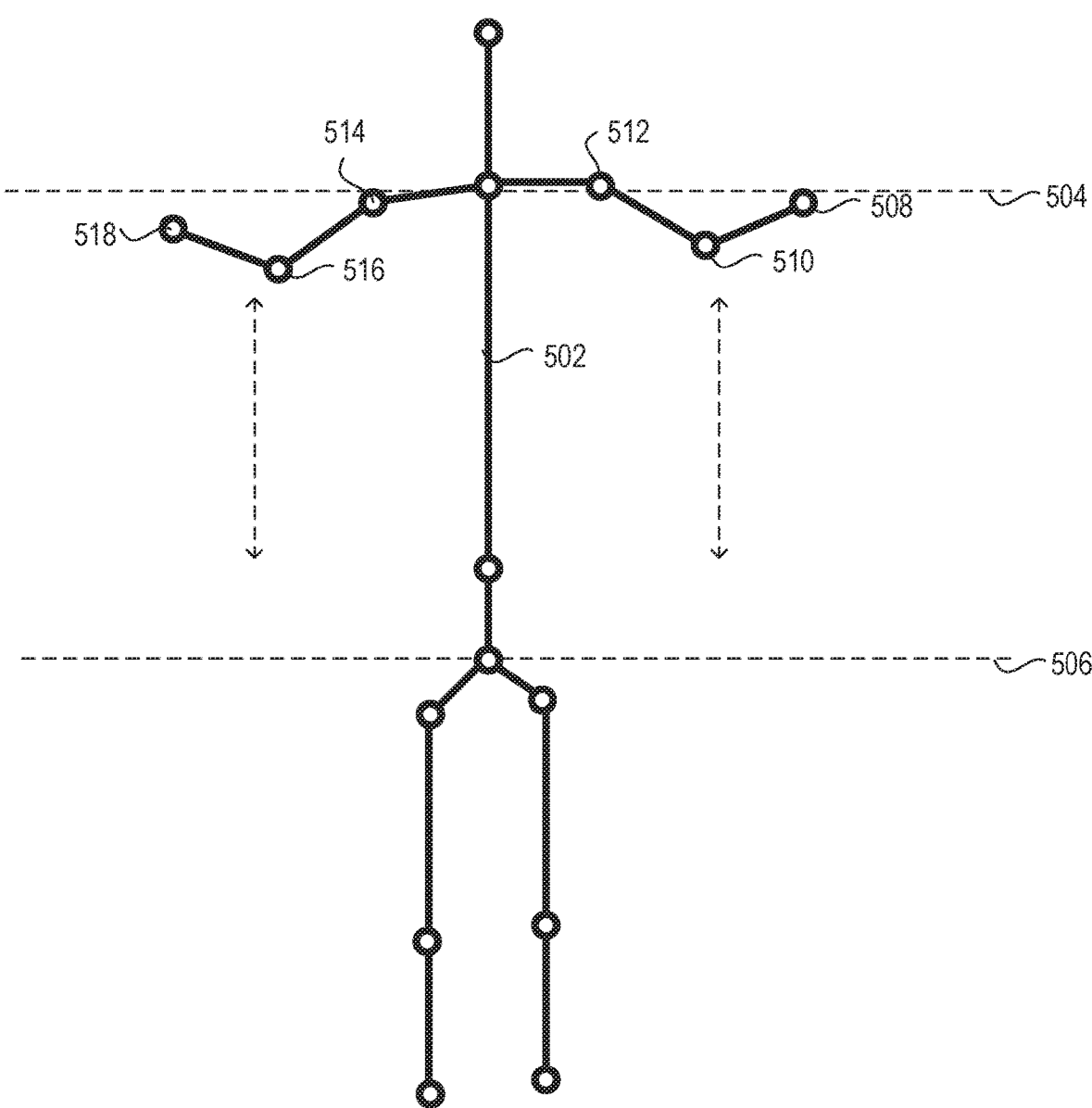
FIG. 5 is a diagram illustrating example user movements for gesture-based load control.

FIG. 5 is a diagram illustrating example user movements for gesture-based load control. As shown in FIG. 5, the skeletal outline 502 of a user may be analyzed to identify a gesture being indicated by the user. For example, one or more coordinates on the skeletal outline 502 may be identified and the coordinates may correspond, or come within a threshold of, the coordinates of an established gesture for indicating a load control device and/or control instructions for controlling a load control device.

A gesture may be identified based on the position of the skeletal outline 502. The position of the skeletal outline 502 may be determined based on one or more coordinates of the skeletal outline 502. The gesture indicated by skeletal outline 502 may be identified by determining the hand coordinates 508, 518 and elbow coordinates 510, 516. An established gesture that may be identified when the hand coordinates 508, 518 and elbow coordinates 510, 516 are on the horizontal line 504 with shoulder coordinates 512, 514. The established gesture may also be identified when the hand coordinates 508, 518 and elbow coordinates 510, 516 are within a threshold (e.g., one foot) of the horizontal line 504. The horizontal line 504 may be established at, or within a threshold of, shoulder coordinates 512, 514.

A gesture may be identified based on a movement performed by the skeletal outline 502. The movement of the skeletal outline 502 may be determined based on one or more coordinates of the skeletal outline. An established gesture that may be identified when the hand coordinates 508, 518 and elbow coordinates 510, 516 move toward or away from the horizontal line 504. For example, when the hand coordinates 508, 518 and elbow coordinates 510, 516 move toward the horizontal line 504, an established gesture may be identified that causes control instructions to be sent to a ballast for increasing a dimming level of a lighting fixture of the ballast.

Multiple gestures may be identified within a same time period. For example, an established gesture may be identified for indicating a load control device, such as a motorized window treatment for example, when the left hand coordinates 508, left elbow coordinates 510, and left shoulder coordinates 512 come within a threshold of the horizontal line 504. Within a same period of time, an established gesture may be identified for indicating control instructions for controlling the motorized window treatment when the right hand coordinates 518, right elbow coordinates 516, and right shoulder coordinates 514 move toward the horizontal line 504. For example, the identified gesture may cause the identified motorized window treatment to raise the position of the covering material controlled by the motorized window treatment.

The speed at which a gesture is performed may be identified. The speed may be identified by tracking the speed of one or more coordinates on the skeletal outline 502. For example, the speed at which the right hand coordinates 518 moves toward the horizontal line 504 may be tracked. The speed at which a gesture is performed may be used to indicate a load control device or control instructions. The speed at which a gesture is performed may be used to indicate a speed at which an electrical load controlled by the load control device may be controlled. For example, the speed at which the right hand coordinates 518 moves toward the horizontal line 504 may be identified and the control instructions sent to the identified motorized window treatment may indicate a speed for raising the position of the covering material controlled by the motorized window treatment based on the speed at which the right hand coordinates 518 moves.

The speed indicated in the control instructions may be based on the speed at which the right hand coordinates 518 move toward the horizontal line 504, taking into consideration the operation speed of the device being controlled. The speed indicated in the control instructions may be the same speed at which the right hand coordinates 518 move toward the horizontal line 504 or otherwise determined from the speed at which the right hand coordinates 518 move toward the horizontal line 504. For example, the speed at which the coordinates 518 move may be a percentage of the speed indicated in the control instructions or the speed indicated in the control instructions may be a percentage of the speed at which the coordinates 518 move. When multiple coordinates are used, the speed of the coordinates may be averaged or the speed of each coordinates may be weighted to determine the speed indicated in the control instructions.

The distance over which a gesture is performed may be identified. The distance may be identified by tracking the distance over which one or more coordinates on the skeletal outline 502 move. For example, the distance over which the right hand coordinates 518 move toward the horizontal line 504 may be tracked. The distance over which a gesture is performed may be used to indicate a load control device or control instructions. The distance over which a gesture is performed may be used to indicate a distance or range over which a device controlled by the load control device may be instructed to change. For example, the distance over which the right hand coordinates 518 move between the horizontal line 506 and the horizontal line 504 may be identified and the control instructions sent to an identified motorized window treatment may indicate a distance for raising the position of the covering material controlled by the motorized window treatment. The horizontal line 506 may be a horizontal line at the hip-center coordinate or the waist of the user. In another example, the distance over which the right hand coordinates 518 move between the horizontal line 506 and the horizontal line 504 may be identified and the control instructions sent to an identified ballast may indicate a range for increasing or decreasing the dimming level of a lighting load controlled by the ballast.

The distance or range indicated in the control instructions may be based on the distance over which the coordinates move between the horizontal line 504 and horizontal line 506, taking into consideration the distance or range over which the device being controlled may be configured to change. The horizontal line 504 may represent a maximum level for changing the device being controlled, such as a maximum height for raising a covering material or a maximum dimming level, and the horizontal line 506 may represent a minimum level for changing the device being controlled, such as the minimum height for lowering a covering material or a minimum dimming level. When the coordinates move above the horizontal line 504 or below the horizontal line 506 the gesture being performed may be disregarded. As the covering material may be at a maximum height or the dimming level may be at a maximum when the user moves the right hand coordinates 518 to the horizontal line 504, the gesture-based control device may fail to send control instructions when the right hand coordinates 518 move above the horizontal line 504. In another example, the gesture-based control device may send the instructions and the load control device may disregard the instructions.

The distance indicated in the control instructions may be the same distance over which the coordinates move between the horizontal line 504 and the horizontal line 506. The distance indicated in the control instructions may be otherwise determined from the distance over which the coordinates move between the horizontal line 504 and the horizontal line 506. For example, the distance over which the coordinates move may be a percentage of the distance indicated in the control instructions or the distance indicated in the control instructions may be a percentage of the distance over which the coordinates move. When multiple coordinates are used, the distance over which the coordinates move may be averaged or each of the coordinates may be weighted.

The absolute position at which a gesture is performed may be identified and used to control an electrical load provided by a load control device. The absolute position of a gesture may be identified based on the position of one or more coordinates on the skeletal outline 502. The absolute position at which a gesture is performed may be used to indicate a load control device or control instructions. The absolute position at which a gesture is performed may be used to indicate an amount of change that may be effected by the load control device. For example, the right hand coordinates 518 may be identified at a position between the horizontal line 506 and the horizontal line 504 (e.g., for a period of time) and control instructions may be sent to the motorized window treatment that indicate a position for the covering material controlled by the motorized window treatment. If the right hand coordinates 518 are identified (e.g., for a period of time) halfway between the horizontal line 504 and the horizontal line 506, the motorized window treatment may change the position of the covering material (e.g., raise or lower) to a halfway position. The gesture-based control device may track the position of the right hand coordinates 518 and actively raise and lower the covering material as the position of the right hand coordinates 518 raise and lower.

Figure 6:
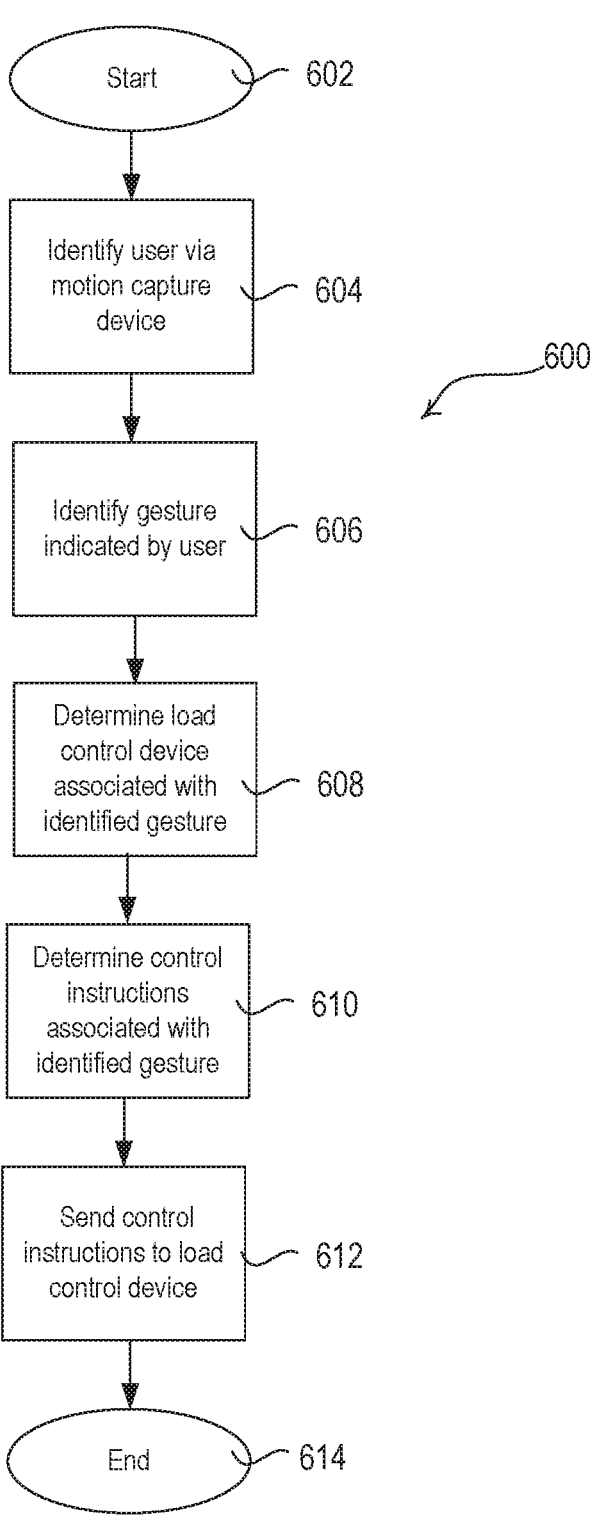
FIG. 6 is a simplified flow diagram depicting an example method for performing gesture-based control of one or more devices.

FIG. 6 is a simplified flow diagram depicting an example method 600 for performing gesture-based control of one or more load control devices. The method 600 may be performed using a motion capture device and/or a gesture-based control device (e.g., the motion capture device 308 and the gesture-based control device 328 shown in FIG. 3). The method 600 may begin at 602. At 604, a user may be identified via the motion capture device. The motion capture device may generate images that include the user. The user may be identified by the motion capture device or the motion capture device may send the images to the gesture-based control device for user identification. The user may be identified by analyzing one or more images to detect coordinates associated with the user's body.

The gesture indicated by the user may be identified at 606. The gesture may be identified by comparing the location of the coordinates associated with the user's body with the coordinates of one or more established gestures. For example, the left hand coordinates and the right hand coordinates of a skeletal outline of a user may be compared with the left hand coordinates and the right hand coordinates of a gesture stored at the gesture-based control device. At 608, the load control device associated with the identified gesture may be determined. The control instructions associated with the identified gesture may be determined at 610. The load control device and the control instructions may be determined from the same gesture or from different gestures.

The location of the left hand coordinates and the right hand coordinates of the user's skeletal outline may indicate control instructions for controlling a lighting control device. In another example, the left hand coordinates may indicate the load control device and the right hand coordinates may indicate the control instructions for the load control device. For example, the left hand coordinates may indicate a lighting control device for being controlled and the right hand coordinates may indicate the control instructions for controlling the lighting control device. At 612, the control instructions may be sent to the load control device. The method 600 may end at 614.

Figure 7:
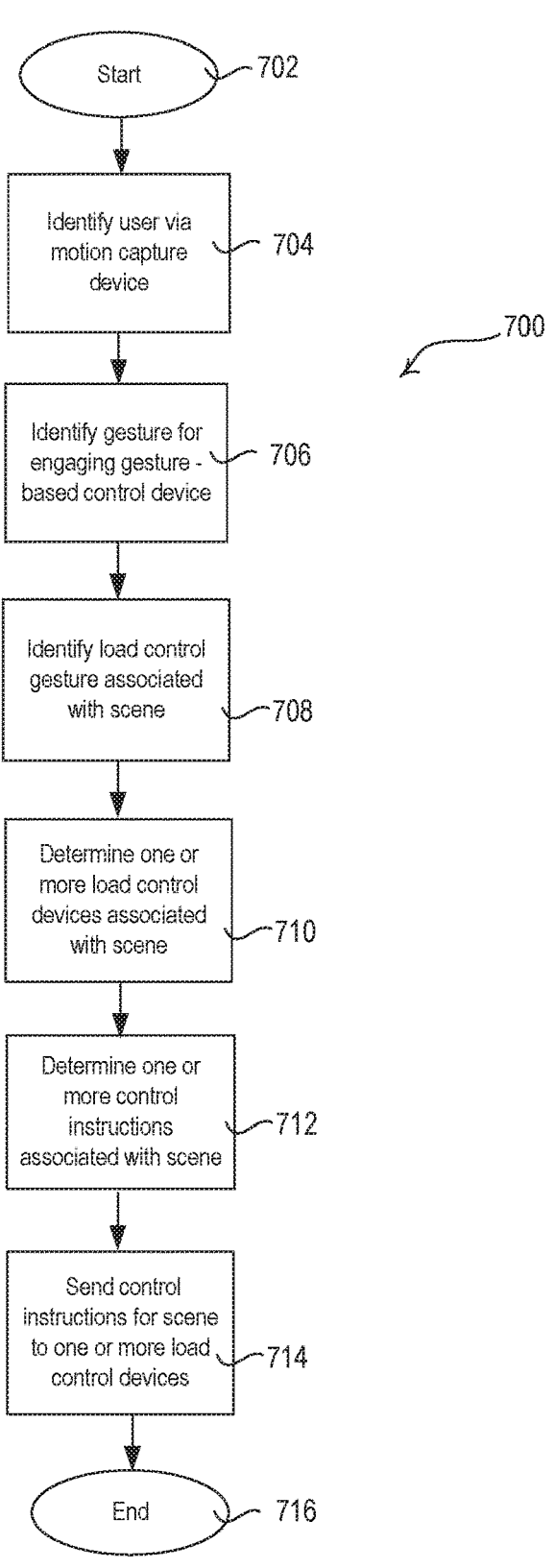
FIG. 7 is a simplified flow diagram depicting another example method for performing gesture-based control of one or more devices.

FIG. 7 is a simplified flow diagram depicting an example method 700 for performing gesture-based control of one or more load control devices. The method 700 may be performed using a motion capture device and/or a gesture-based control device. The method 700 may begin at 702. At 704, a user may be identified via the motion capture device. An engage gesture may be identified at 706 for engaging the gesture-based control device (e.g., the motion capture device 308 and the gesture-based control device 328 shown in FIG. 3). The engage gesture may be identified after being indicated for an established period of time, such as a three second period of time for example. The engage gesture may include one or more gestures (e.g., a sequence of gestures) that may be unlikely to be performed by a user by mistake. For example, the user may perform a movement that is unlikely to be performed by a user when the user is not engaging the gesture-based control device. In another example, the engage gesture may be performed for a longer period of time (e.g., 10-20 seconds) than other gestures may be performed, such as gestures that may be recognized by the gesture-based control device or that may be likely to be performed naturally by the user.

A load control gesture may be identified at 708. The load control gesture identified at 708 may be used to configure a scene in the user environment. The configured scenes may include a movie scene for configuring one or more load control devices for watching a movie, a bedtime scene for one or more load control devices when the user goes to bed, an away scene for controlling one or more load control devices when the user is away from the user environment, a stay scene for controlling one or more load control devices when the user is located in the user environment, or the like. The scene configuration may be determined based on user input. At 710, one or more load control devices associated with the detected scene may be determined. One or more control instructions associated with the detected scene may be determined at 712. At 714, the control instructions for the detected scene may be sent to the one or more load control devices. For an away scene, for example, the lighting control devices may dim the lighting fixtures to a predetermined level or turn the lighting fixtures off, the motorized window treatment may lower the position of the covering material for the windows, and/or the thermostat may be turned up (e.g., in the summer) or down (e.g., in the winter) to reduce power consumption while the user is away. The control instructions determined at 712 and sent at 714 may include an indication of the detected scene and the one or more load control devices may determine how to control their respective electrical loads in response to the indication of the detected scene. The method 700 may end at 716.

Referring again to the load control environment 302 in FIG. 3, the user 322 may perform a load control gesture that indicates a scene for controlling one or more load control devices in the load control environment 302. For example, the gesture-based control device 328 may identify a load control gesture that indicates a bedtime scene and may instruct the lighting control device 304 to decrease the power provided to the lighting load 306, instruct the AC plug-in load control device 324 to decrease the power provided to the floor lamp 326, instruct the motorized window treatment 316 to lower the covering material 318, and/or instruct the thermostat 320 to decrease the temperature in the load control environment 302 according to the detected bedtime scene.

Figure 8:
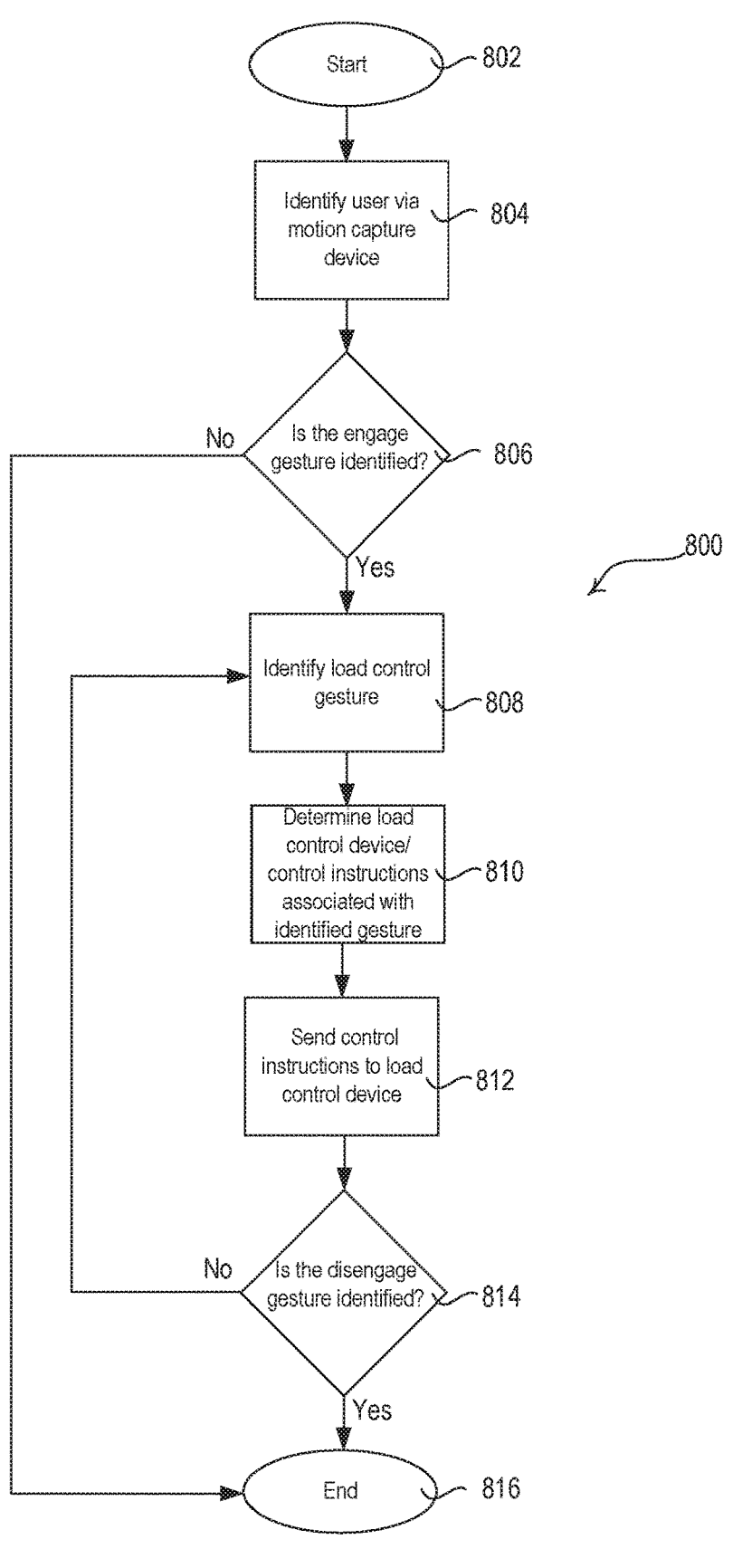
FIG. 8 is a simplified flow diagram depicting an example method for engaging and disengaging a gesture-based control device for identifying gestures.

FIG. 8 is a simplified flow diagram depicting an example method 800 for engaging and disengaging a gesture-based control device for identifying load control gestures. The method 800 may be performed using a motion capture device and/or a gesture-based control device (e.g., the motion capture device 308 and the gesture-based control device 328 shown in FIG. 3). The method 800 may begin at 802. At 804, a user may be identified via the motion capture device. The engage gesture may be identified at 806 for engaging the gesture-based control device for identifying load control gestures. For example, the gesture-based control device may identify the right hand or left hand coordinates of a skeletal outline of a user as being held above the user's head for a period of time to disengage the gesture-based control device. The user may also perform the engage gesture by moving a left hand or a right hand along a vertical line, as if to indicate a "turn-on" gesture for example. If the engage gesture is not identified at 806, the method 800 may end at 816. If the engage gesture is identified at 814, the method 800 may continue to identify a load control gesture at 808. The identification of the engage gesture at 806 may enable the gesture-based control device to identify the load control gesture at 808. Without identifying the engage gesture, the gesture-based control device may be unable to identify other control instructions for controlling the load control device or the gesture-based control device. At 810, the load control device and/or the control instructions associated with the identified gesture may be determined. The control instructions may be sent to the load control device at 812.

At 814, a disengage gesture may be identified. For example, the gesture-based control device may identify the right hand or left hand coordinates of a skeletal outline of a user as being held below the user's shoulder for a period of time to engage the gesture-based control device. The user may also perform the disengage gesture by moving a left hand or a right hand across a horizontal line, as if to indicate a "clearing" or "sweeping" gesture for example, or along a vertical line, as if to indicate a "turn-off" gesture for example. The disengage gesture may cause the gesture-based control device to be unable to identify a load control gesture until the engage gesture is identified. If the disengage gesture is identified at 814, the method may end at 816. If the disengage gesture is not identified at 814, the method 800 may continue to identify load control gestures at 808.

Figure 9A:
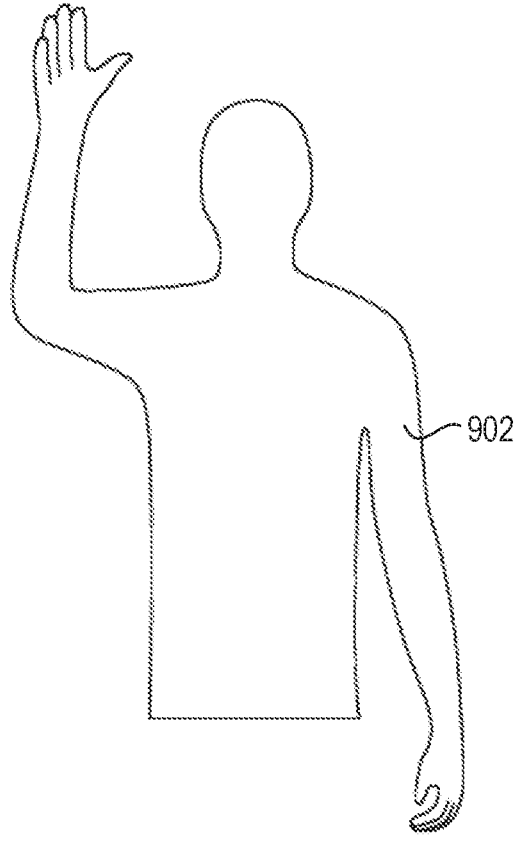
FIGS. 9A-9E depict example gestures that may be identified for controlling devices.
Figure 9B:
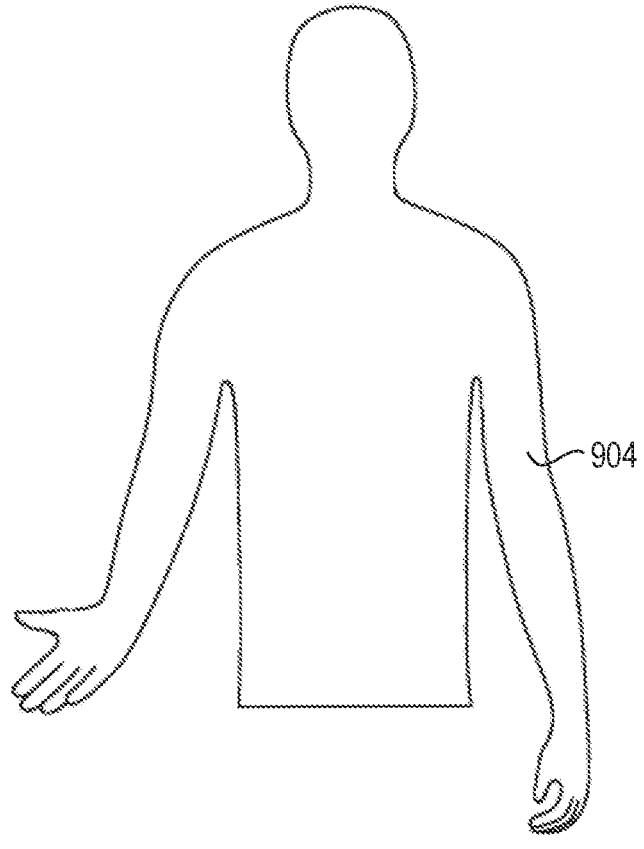
Figure 9C:
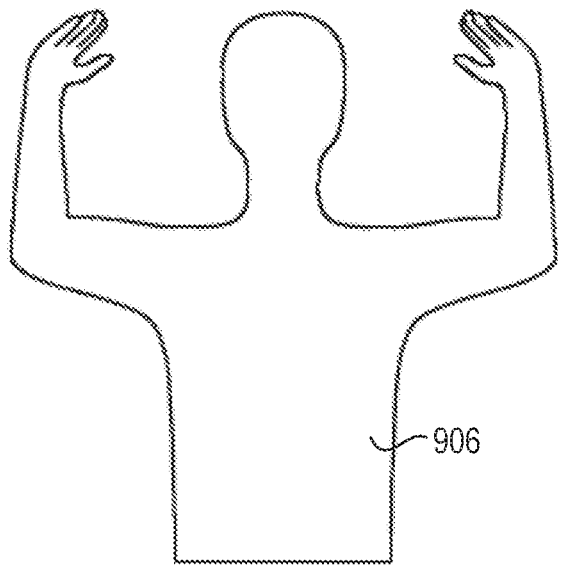
Figure 9D:
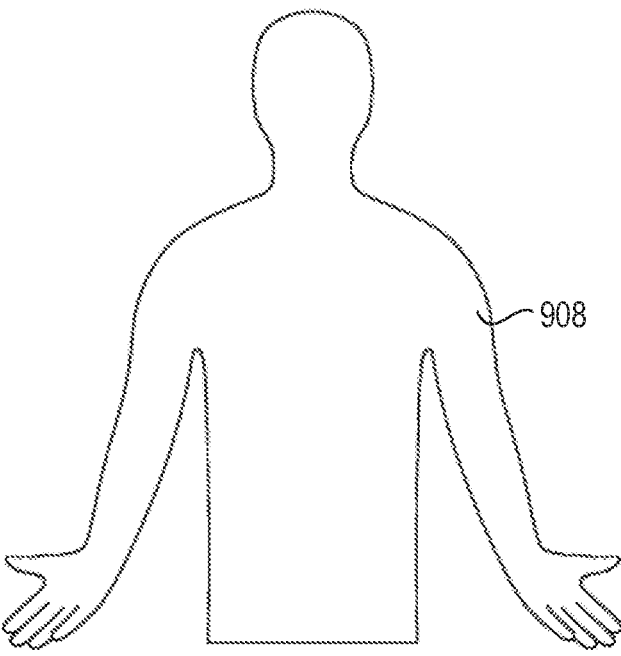

FIGS. 9A-9E depict example gestures that may be identified for controlling load control devices. As shown in FIGS. 9A and 9B, a gesture may be performed with one arm. The arm may be raised as illustrated by gesture 902 or may be lowered as illustrated by gesture 904. As shown in FIGS. 9C and 9D, a gesture may be performed with two arms. The arms may be raised as illustrated at 906 or may be lowered as illustrated at 908. Each of the gestures 902-908 may be used to indicate one or more load control devices and/or one or more control instructions. The gestures 902-908 may indicate a command to control the gesture-based control device. One or more of the gestures 902-908 may be used to engage the gesture-based control device, disengage the gesture-based control device, or put the gesture-based control device into a programming mode. For example, the engage gesture may be the gesture 902 shown in FIG. 9A and/or the disengage gesture may be the gesture 904 shown in FIG. 9B.

Figure 9E:
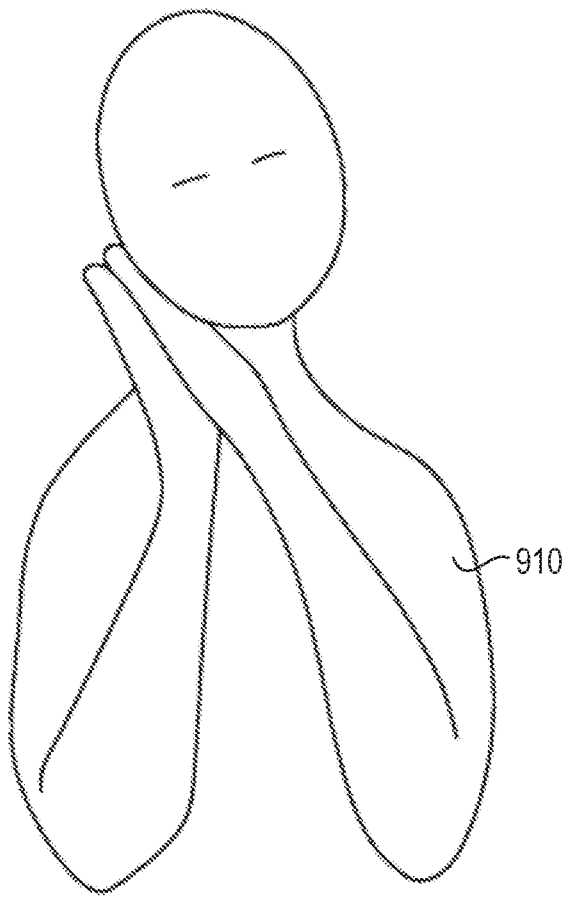

As shown in FIG. 9E, a gesture may be performed to control one or more load control devices according to an established scene. The sleep gesture 910 may be performed to control one or more load control devices according to a bedtime scene. As illustrated by the sleep gesture 910, an established gesture may illustrate the scene to which it is associated. The sleep gesture 910 is performed by a user placing their hands next to their head to depict the user sleeping. If facial recognition is used, the user's eyes may be closed to indicate the sleep gesture 910.

Figure 10:
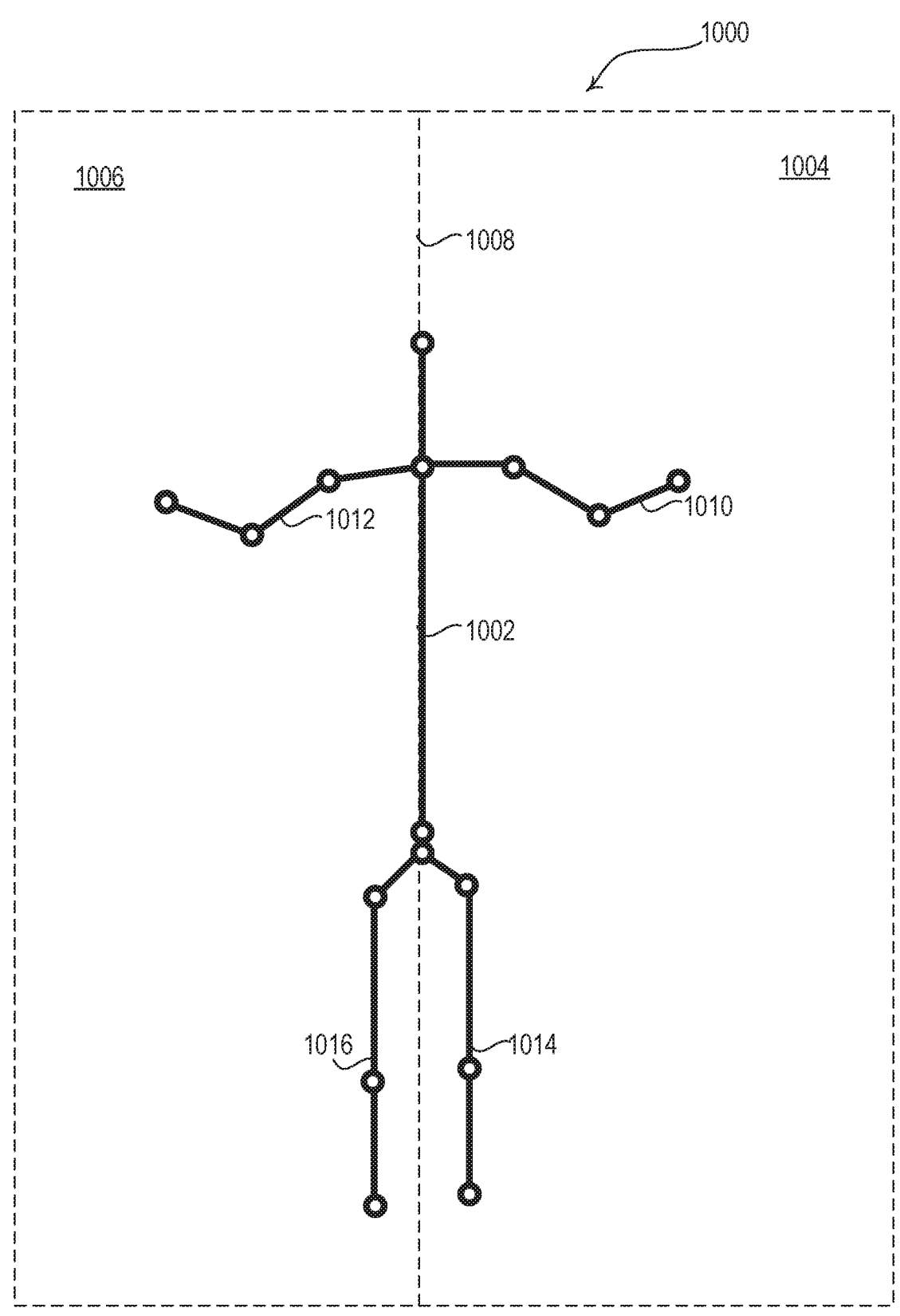
FIG. 10 is a diagram depicting an example mapping configuration for gesture-based load control.

FIG. 10 is a diagram depicting an example regional mapping configuration 1000 for gesture-based load control. The regional mapping configuration 1000 may include a configuration of one or more regions of a user environment. The regional mapping configuration 1000 may be used to identify load control devices and/or control instructions indicated by a user gesture, such as when the user is facing the motion capture device for example. The regional mapping configuration 1000 may include a number of two-dimensional and/or three-dimensional regions, such as regions 1004 and 1006 for example. Each region 1004, 1006 may be associated with one or more load control devices and/or control instructions. The partition 1008 between regions 1004 and 1006 may be used to divide the regions of the user environment. The partition 1008 between regions 1004 and 1006 may be used to divide coordinates on the skeletal outline 1002. The partition 1008 may move with the skeletal outline 1002 to distinguish gestures performed with the left arm 1010 or left leg 1014 from gestures performed by the right arm 1012 or right leg 1016.

Different load control devices and/or control instructions may be indicated based on gestures performed in each region 1004, 1006. The gesture may be identified based on one or more coordinates on the skeletal outline 1002. When one or more coordinates on the left arm 1010 of the skeletal outline 1002 indicate a gesture, the load control devices and/or control instructions associated with that gesture may be identified. When one or more coordinates on the right arm 1012 of the skeletal outline 1002 indicate a gesture, the load control devices and/or control instructions associated with that gesture may be identified. The same gesture performed in each region 1004, 1006 may indicate a different command.

FIG. 11 is a simplified flow diagram depicting an example method 1100 for gesture-based load control using regional mapping configurations. The method 1100 may be performed using a motion capture device and/or a gesture-based control device (e.g., the motion capture device 308 and the gesture-based control device 328 shown in FIG. 3). The method 1100 may begin at 1102. At 1104, a first gesture associated with a load control device may be identified in a region of a regional mapping configuration, such as the region 1004 of the regional mapping configuration 1000 in FIG. 10. At 1106, a second gesture associated with control instructions for the load control device may be identified in a region of a regional mapping configuration, such as the region 1006 of the regional mapping configuration 1000 in FIG. 10. The first gesture and the second gesture may be identified in the same region or different regions of the regional mapping configuration. The first gesture and the second gesture may be the same or different gestures. The first gesture may be identified based on the coordinates of the user's left arm in the region 1004 and the second gesture may be the same gesture identified based on the coordinates of the user's right arm in region 1006, for example. In another example, the first gesture may be identified based on the coordinates of the user's left arm in the region 1004 and the second gesture may be identified based on the coordinates of the user's right arm in the same region 1004.

The load control device may be determined at 1108 based on the first gesture and the region in which the first gesture is identified. Different gestures in the same region may indicate different load control devices. The same gesture in a different region may indicate a different load control device. For example, the user's left arm being located above the user's head in the region 1004 may indicate a different load control device than the user's left arm being located below the user's head in the region 1004. The user's right arm being located above the user's head in the region 1006 may indicate a different load control device than the user's left arm being located above the user's head in the region 1004.

The control instructions for controlling the load control device may be determined at 1108 based on the second gesture and the region in which the second gesture is identified. Different gestures in the same region may indicate different control instructions. The same gesture in a different region may indicate a different load control device. For example, the user's left arm being raised in the region 1004 may indicate a different control instruction than the user's left arm being lowered in region 1004. The user's right arm being raised in the region 1006 may indicate a different control instruction than the user's left arm being raised in the region 1004. The control instructions may be sent to the identified load control device at 1110. The method 1100 may end at 1112.

Figure 12:
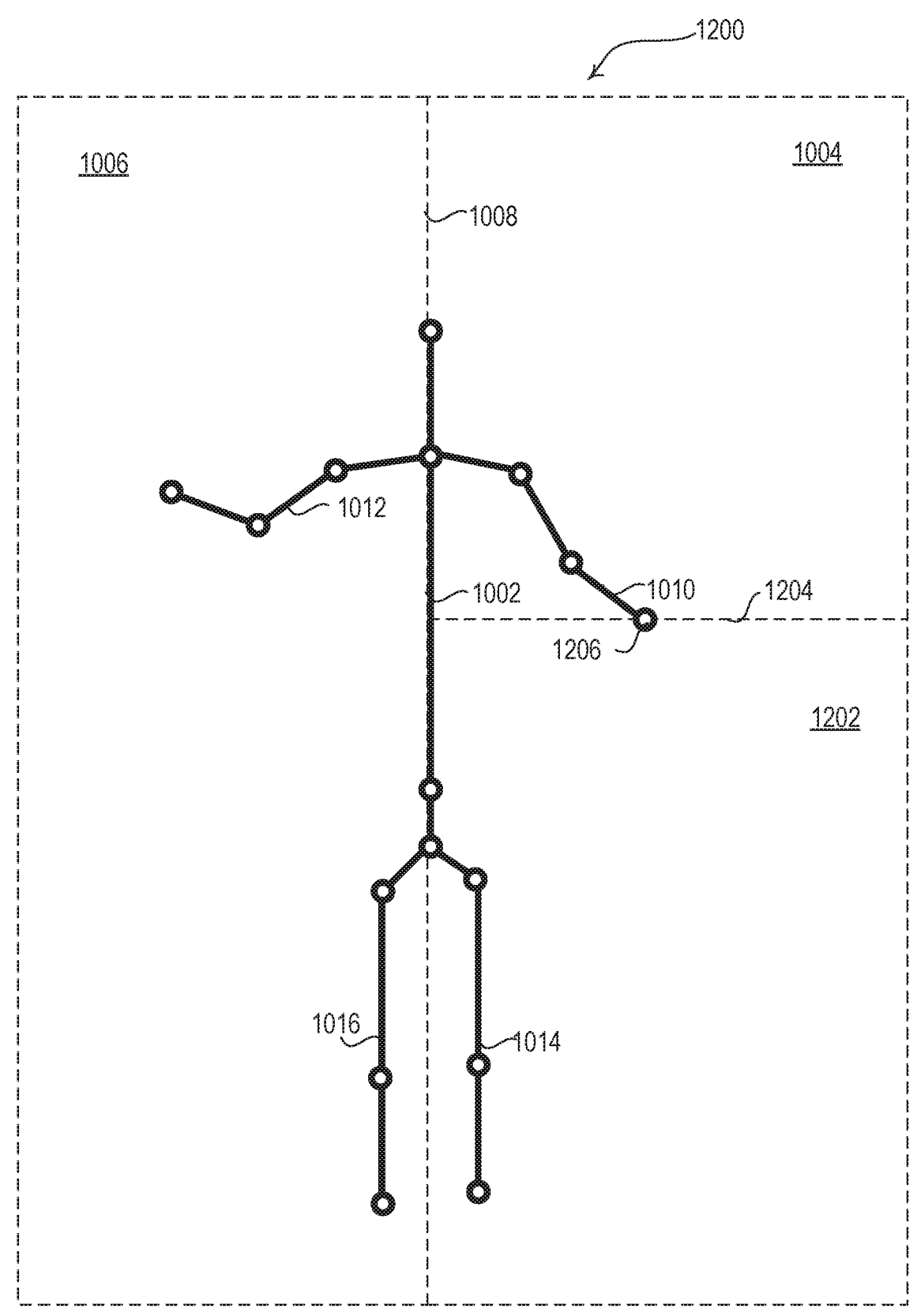
FIG. 12 is a diagram illustrating an example for programming a regional mapping configuration for gesture-based load control.

FIG. 12 is a diagram illustrating an example for programming a regional mapping configuration 1200 for gesture-based load control. A user may program the regional mapping configuration 1200 at the gesture-based control device using one or more gestures. The user may put the gesture-based control device in programming mode by performing a programming gesture. The gesture-based control device may identify the programming gesture by analyzing one or more coordinates of the skeletal outline 1002 of the user. When the gesture-based control device identifies the programming gesture it may enter a programming mode.

The user may perform a gesture to add a region to a regional mapping configuration, such as the regional mapping configuration 1000 of FIG. 10, to create regional mapping configuration 1200. The regional mapping configuration 1200 may include the regions 1004 and 1006, which may be separated by partition 1008. The user may perform a gesture to create the region 1202. For example, the user may perform a gesture to indicate a load control device in the region 1202. The region 1202 may be created to include the identified load control device. The partition 1204 may be generated to include the identified load control device within the region 1202. The partition 1204 may be generated automatically to include the identified load control device within the region 1202 or may be created by the user. The control instructions may be automatically associated with the identified load control device or programmed by the user.

The regional mapping configuration 1200 may be generated to distinguish between gestures performed in different location. The regions 1004 and 1202 may also be used to identify gestures for indicating control instructions that may be performed at a higher location or a lower location, respectively. The regional mapping configuration 1200 may be used to distinguish between gestures performed at the higher location, e.g., in region 1004, and the lower location, e.g., in region 1202. The region 1202 may be generated to identify gestures to load control devices at a lower location, such as a floor lamp or an AC-plug-in control device. The region 1004 may be used to identify gestures to load control devices at a higher location, such as a lighting fixture in the ceiling.

The region 1202 may be created by the user inserting the partition 1204 in region 1004. The left hand coordinates 1206 may be identified as indicating the partition 1204, such as by running horizontally along the partition 1204 or by remaining at the location of the partition 1204 for a period of time. The region 1202 may be associated with one or more gestures, load control devices, and/or control instructions. As region 1004 may be modified upon the creation of region 1202, region 1004 may be reconfigured, such as by being associated with one or more gestures, load control devices, and/or control instructions.

The user may perform a gesture to remove the region 1202 from the regional mapping configuration 1200. The user may put the gesture-based control device in programming mode for removing the region 1202. The programming gesture for removing the region 1202 may be different than the programming gesture for creating the region 1202. The user may perform a gesture to remove the region 1202. The user may indicate the device in the region 1202 for removing the region 1202. The user may indicate the removal of partition 1204, such as by running the user's hand horizontally along the partition 1204 or by holding the user's hand at the location of the partition 1204 for a period of time. As the region 1202 may be removed, the region 1004 or the region 1006 may occupy the region 1202 area. In an example, the space that occupied the region 1202 may be unassociated with a load control device or control instructions after the region 1202 is removed.

Figure 13:
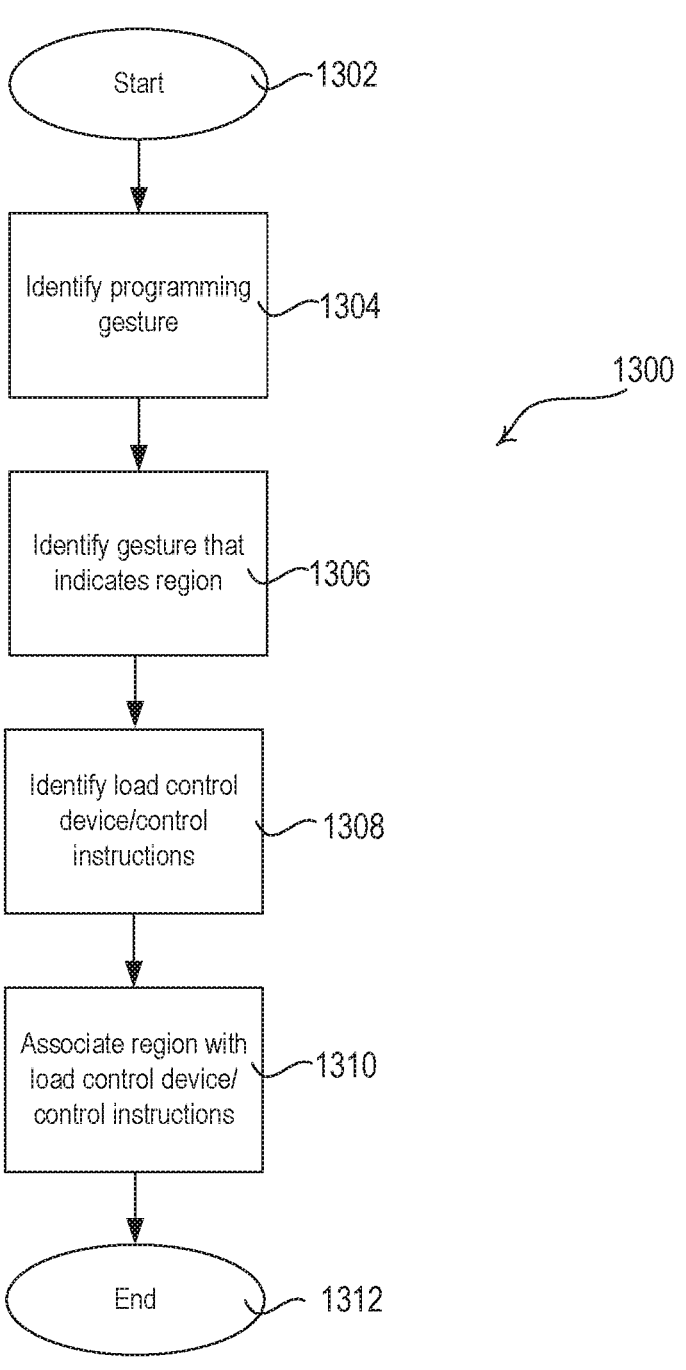
FIG. 13 is a simplified flow diagram depicting an example method for associating a region of a regional mapping configuration with a device and/or control instructions.

FIG. 13 is a simplified flow diagram depicting an example method 1300 for associating a region of a regional mapping configuration with a load control device and/or control instructions. The method 1300 may be performed using a motion capture device and/or a gesture-based control device (e.g., the motion capture device 308 and the gesture-based control device 328 shown in FIG. 3). The method 1300 may begin at 1302. A programming gesture may be identified at 1304. Identification of the programming gesture may enable the gesture-based control device to receive programming instructions for programming one or more functions on the gesture-based control device. The programming gesture may trigger a programming mode for associating a region with a load control device and/or control instructions. The programming gesture may include one or more gestures (e.g., a sequence of gestures) that may be unlikely to be performed by a user by mistake. For example, the user may perform a movement that is unlikely to be performed by a user when the user is not programming the gesture-based control device. The programming gesture may be performed for a longer period of time (e.g., 10-20 seconds) than other gestures may be performed, such as gestures that may be recognized by the gesture-based control device or that may be likely to be performed naturally by the user.

At 1306, a gesture may be identified that indicates a region. The user may point in the direction of the region or place a portion of the user's body in the in the region to indicate the region. The region may be a two-dimensional or three-dimensional region. One or more load control devices and/or control instructions may be identified at 1308 for being associated with the region. The load control device may be identified at 1308 by analyzing a gesture performed by the user that is associated with the load control devices and/or the control instructions. A load control device may be identified by actuating a button on the load control device that triggers identification information associated with the load control device. The load control device may be located within the region indicated at 1306 or may be outside of the indicated region. The identified region may be associated with the identified load control device and/or control instructions at 1310. For example, the gesture-based control device may store the association of one or more coordinates of the user for indicating the load control device and/or control instructions with the identified region. Once the region is associated with the load control device and/or control instructions, the user may gesture to the region or perform an associated gesture in the region to send the control instructions to the associated load control device. The method 1300 may end at 1312.

Figure 14:
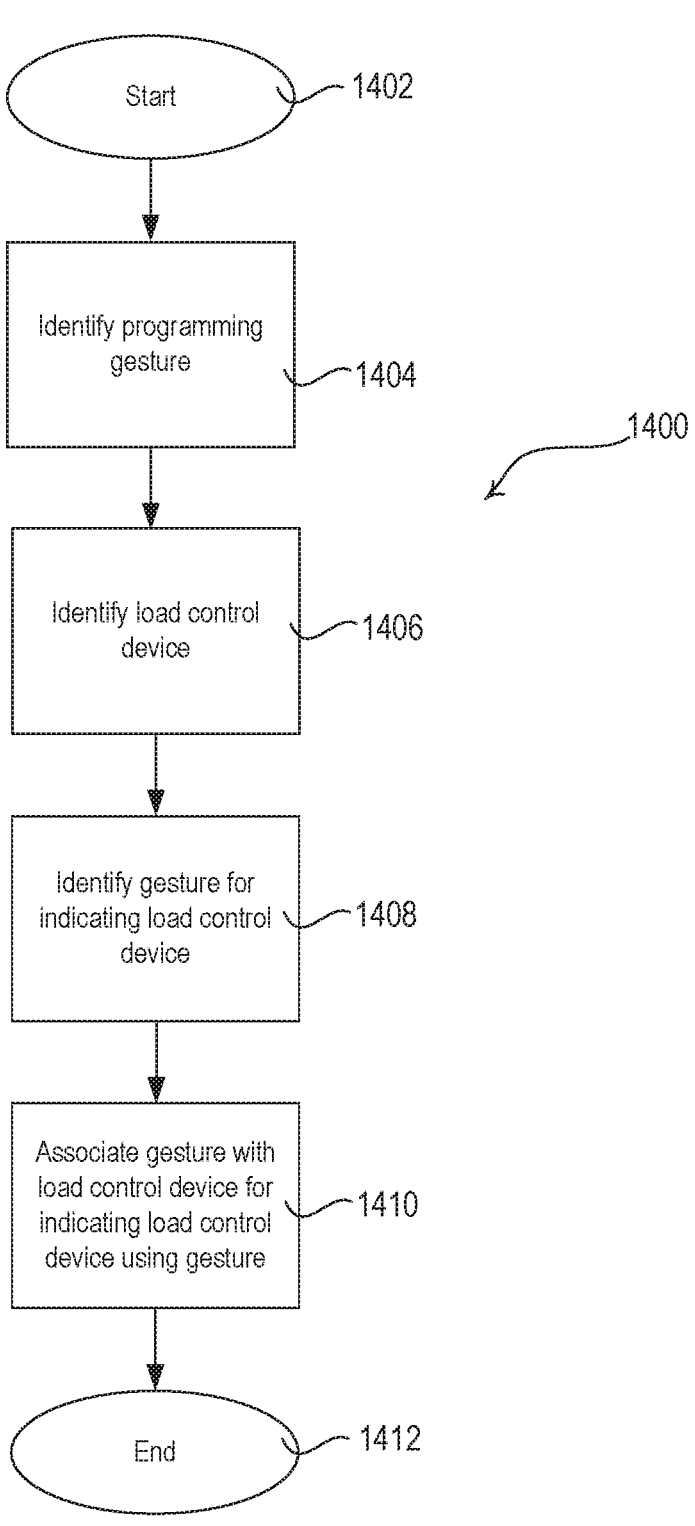
FIG. 14 is a simplified flow diagram depicting an example method for associating a gesture with a device.

FIG. 14 is a simplified flow diagram depicting an example method 1400 for associating a gesture with a load control device. The method 1400 may be performed using a motion capture device and/or a gesture-based control device (e.g., the motion capture device 308 and the gesture-based control device 328 shown in FIG. 3). The method 1400 may begin at 1402. A programming gesture may be identified at 1404. The programming gesture may trigger a programming mode for associating a gesture with a load control device. The programming gesture identified at 1404 may be the same as or different from the programming gesture performed at 1304 in FIG. 13.

A load control device may be identified at 1406 for being associated with a gesture for identification. For example, the load control device may be identified at 1406 by analyzing a gesture performed by the user that is already associated with the load control device. The gesture may indicate the load control device itself or a region associated with the load control device. For example, the user may point in the direction of the load control device or place a portion of the user's body in the in the region associated with the load control device. A load control device may be identified at 1406 by a user actuating a button on the load control device that triggers identification information associated with the load control device.

A gesture may be identified at 1408 that may be used for indicating the load control device. For example, the identified load control device may be a lighting control device and a user may point upward toward the ceiling to indicate the load control device. The gesture-based control device may detect that the user is programming another gesture for indicating the load control device. The gesture identified at 1408 may be a predefined gesture (e.g., which may be unassociated or associated with another device) recognized by the gesture-based control device or may be a gesture unknown to the gesture-based control device. The gesture identified at 1408 may be associated with the load control device at 1410. The gesture-based control device may associate the user's gesture toward the ceiling with the lighting control device such that the gesture-based control device is programmed to identify the lighting control device when the user points up toward the ceiling. The association may be stored at the gesture-based control device such that the gesture can be identified for indicating the load control device. The gesture identified at 1408 may replace the gesture used to indicate the load control device at 1406 or may be used as an additional indication. Once the gesture identified at 1408 is associated with the load control device, the user may perform the gesture to indicate the load control device. The method 1400 may end at 1412.

The gesture-based control device may determine the load control device indicated by a user and may automatically associate control instructions with the load control device or may associate the control instructions with the load control device based on user gestures. For example, the gesture-based control device may identify a gesture to a ballast based on one or more images from a motion capture device and may automatically associate the ballast with control instructions for controlling the ballast's lighting fixture. In another example, the gesture-based control device may identify a gesture to the ballast and may identify a gesture indicating control instructions for being associated with the ballast. The association may be stored at the gesture-based control device such that ballast may be controlled by the associated control instructions.

Figure 15:
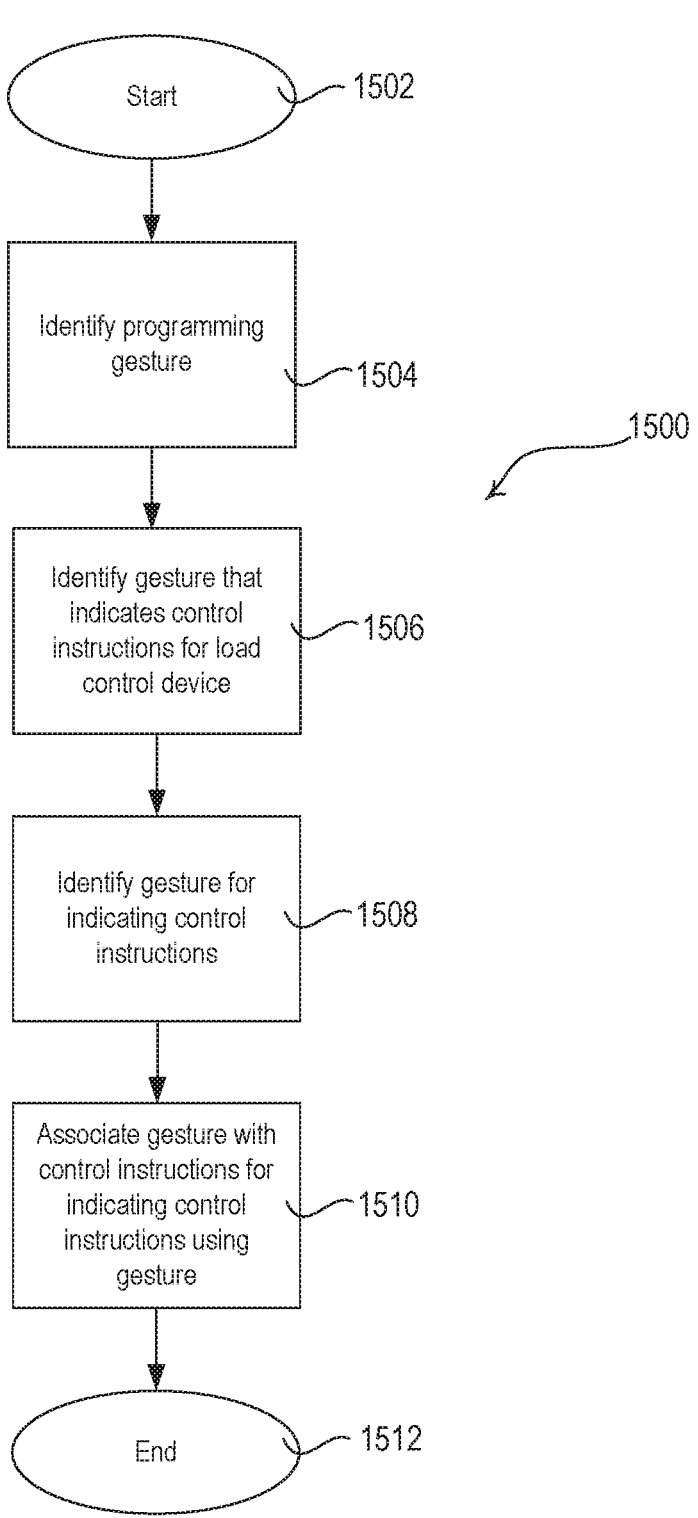
FIG. 15 is a simplified flow diagram depicting an example method for associating a gesture with control instructions.

FIG. 15 is a simplified flow diagram depicting an example method 1500 for associating a gesture with control instructions. The method 1500 may be performed using a motion capture device and/or a gesture-based control device (e.g., the motion capture device 308 and the gesture-based control device 328 shown in FIG. 3). The method 1500 may begin at 1502. A programming gesture may be identified at 1504. The programming gesture may trigger a programming mode for associating a gesture with control instructions. The programming gesture identified at 1504 may be the same as or different from the programming gesture performed at 1304 in FIG. 13 and/or the programming gesture performed at 1404 in FIG. 14.

At 1506, a gesture may be identified that indicates control instructions. The control instructions may include control instructions that are associated with a load control device. For example, the gesture-based control device may identify a gesture for increasing the dimming level of a lighting load when the user raises an arm and may detect that the user is programming another gesture for increasing the dimming level of the lighting load. A gesture may be identified at 1508 that may be used for indicating control instructions. The user may point up to indicate another gesture for increasing the dimming level of the lighting load. The gesture identified at 1508 may be a predefined gesture recognized by the gesture-based control device or may be a gesture unknown to the gesture-based control device. The gesture identified at 1508 may be associated with the control instructions at 1510. The gesture-based control device may associate the user pointing up with the control instructions for increasing the dimming level of a lighting load such that the gesture-based control device is programmed to identify the control instructions for increasing the dimming level of a lighting load when the user points up. The association may be stored at the gesture-based control device such that the gesture can be identified for indicating the control instructions. The gesture identified at 1508 may replace the gesture used to indicate the load control instructions at 1506 or may be used as an additional indication. Once the gesture identified at 1508 is associated with the control instructions, the user may perform the gesture to indicate the control instructions. The method 1500 may end at 1512.

Figure 16A:
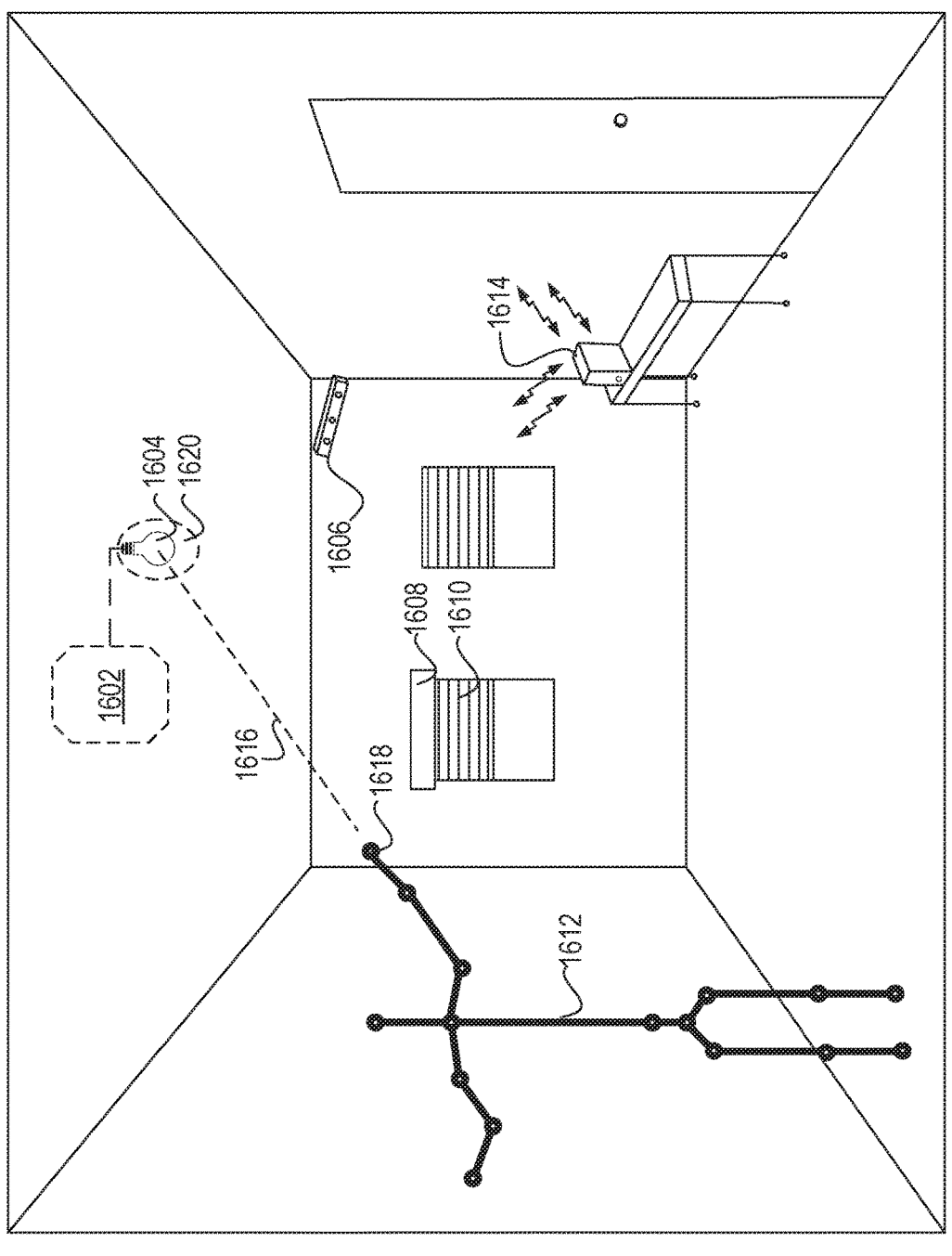
FIG. 16A depicts an example load control environment for identifying devices using vectors.

FIG. 16A depicts an example load control environment for identifying load control devices using vectors. As shown in FIG. 16A, a lighting control device 1602 (e.g., a dimmer switch, a switching device, a ballast, or an LED driver), and/or the electrical load that it controls, such as the lighting load of lighting fixture 1604, may be identified using a vector 1616. To identify the lighting fixture 1604 and/or the ballast 1602, a user may gesture to the lighting fixture 1604 and/or the ballast 1602. The motion capture device 1606 may capture an image of the user, the lighting fixture 1604, and/or the ballast 1602 and send the image to the gesture-based control device 1614. The gesture-based control device 1614 may identify the skeletal outline 1612 based on one or more coordinates thereon.

The gesture-based control device 1614 may identify a gesture to the lighting fixture 1604. The gesture-based control device 1614 may identify the gesture to the lighting fixture 1604 using vector 1616. The gesture-based control device 1614 may use the hand coordinates 1618 of the skeletal outline 1612 as a point of origin for the vector 1616. The points on the vector 1616 may be determined and followed to a position (e.g., a point or area) that represents the lighting fixture 1604. The vector 1616 may be used to identify the lighting fixture 1604 and/or ballast 1602 when the vector 1616 points to a position located on lighting fixture 1604 or any position within a two-dimensional or three-dimensional area 1620 surrounding the lighting fixture 1604. The lighting fixture 1604 and/or the area 1620 may be indicated by one or more vectors.

The gesture-based control device 1614 may use the vector 1616 itself to determine a load control device and/or control instructions. The vector 1616 may be determined relative to the user. The angle and/or direction of the vector 1616 from the user may indicate a load control device and/or control instructions. For example, the gesture-based control device 1614 may identify the vector 1616 as pointing up and right from the user at a forty-five degree angle, which may indicate a user-selection of the lighting control device 1602 and/or control instructions for controlling the lighting control device 1602. While the vector 1616 points to the lighting fixture 1604, the vector 1616 may be used to identify the lighting control device 1602 when the user changes locations (e.g., rotates position or moves to the other side of the room). When the position of the vector 1616 is determined relative to the user, the area to which the vector is pointing may be disregarded.

Figure 16B:
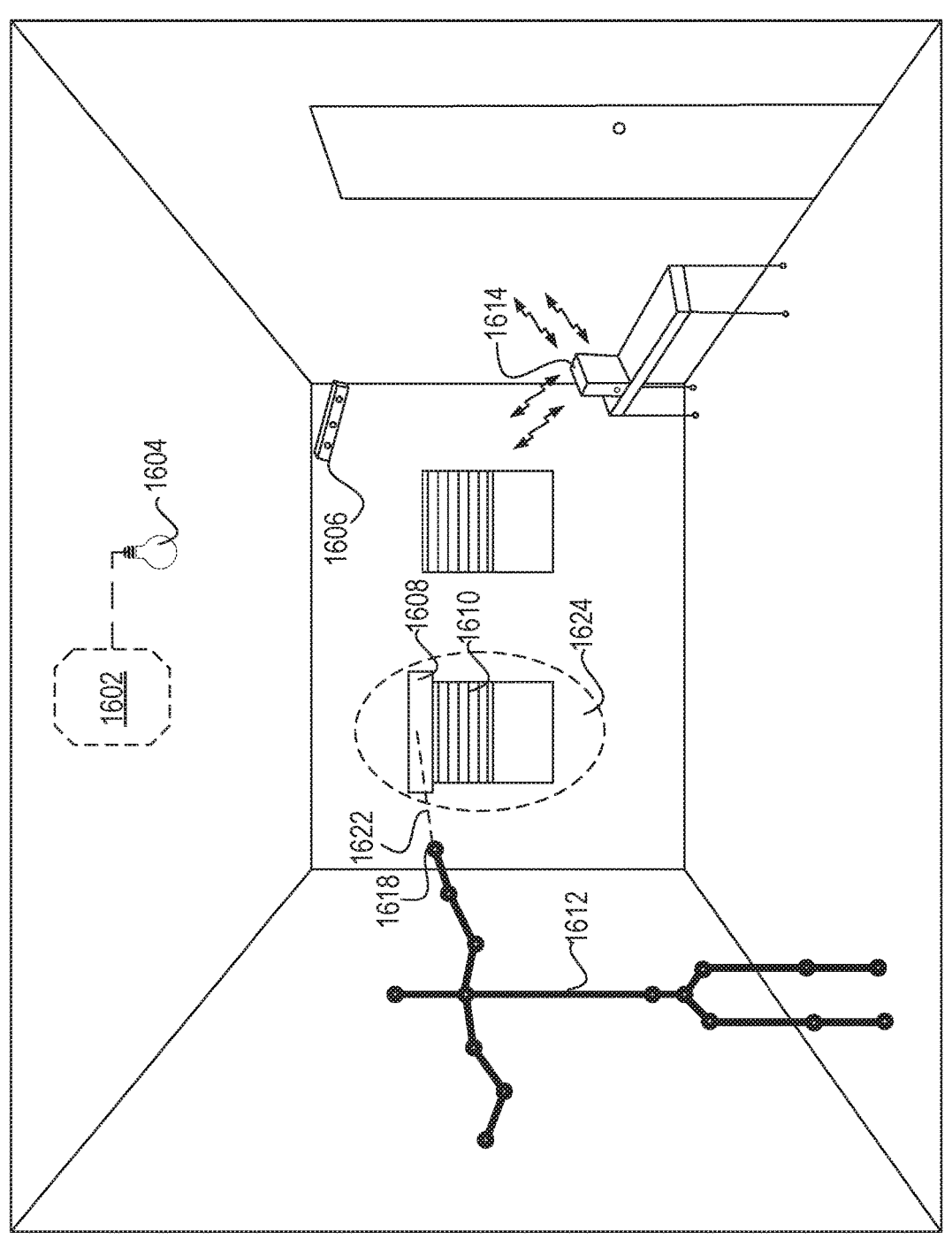
FIG. 16B depicts an example load control environment for programming a gesture-based control device to identify control devices using vectors.

FIG. 16B depicts an example load control environment for programming a gesture-based control device to identify load control devices using vectors. As shown in FIG. 16B, the gesture-based control device 1614 may be programmed using one or more vectors to identify a load control device, such as the motorized window treatment 1608, and/or the device that it controls, such as the covering material 1610. The gesture-based control device 1614 may use the hand coordinates 1618 of the skeletal outline 1612 as a point of origin for the vector 1622. The points on the vector 1622 may be determined and followed to (e.g., extended to the location of) the motorized window treatment 1608.

The vector 1622 may be used to identify the motorized window treatment 1608 when the vector 1622 reaches a position located on the motorized window treatment 1608 or any position within a two-dimensional or three-dimensional area 1624 surrounding the motorized window treatment 1608. The area 1624 may be indicated by one or more vectors. For example, the user may move to the motorized window treatment 1608 and trace the outline of (e.g., circle) the motorized window treatment 1608 and/or the covering material 1610. Multiple vectors may be followed to a point around the area 1624 to indicate the motorized window treatment 1608 and/or the covering material 1610. While a circle is shown in FIG. 16B, the user may also trace a square, a rectangle, or other shape to identify the location of a load control device. Alternatively, the user could identify a point at the location of the load control device. Once the motorized window treatment 1608 has been identified, the user may perform a gesture that may be identified by the gesture-based control device 1614 to indicate the motorized window treatment 1608 and/or control instructions for being executed by the motorized window treatment 1608 to control the covering material 1610. The gesture-based control device 1614 may store an association of the gesture with the motorized window treatment 1608 and/or control instructions for being executed by the motorized window treatment 1608.

Vectors may be used in combination with one or more other gestures to identify and/or control devices. Vectors may be used to identify load control devices, while another gesture may be used to send control instructions. Vectors may be used to indicate control instructions, while other gestures may be used to identify load control devices. In an example, vector 1622 may be used to identify the motorized window treatment 1608, while the user may move an arm up or down to raise or lower the covering material 1610. Control instructions may be identified for instructing the motorized window treatment 1608 to raise or lower the covering material 1608 when the left hand coordinates of the skeletal outline 1612 are between a horizontal line extending from the hip center coordinate and a horizontal line extending from the shoulder coordinate. The control instructions for controlling the motorized window treatment 1608 may be identified and/or implemented so long as the motorized window treatment 1608 is being identified by the user.

Figure 17:
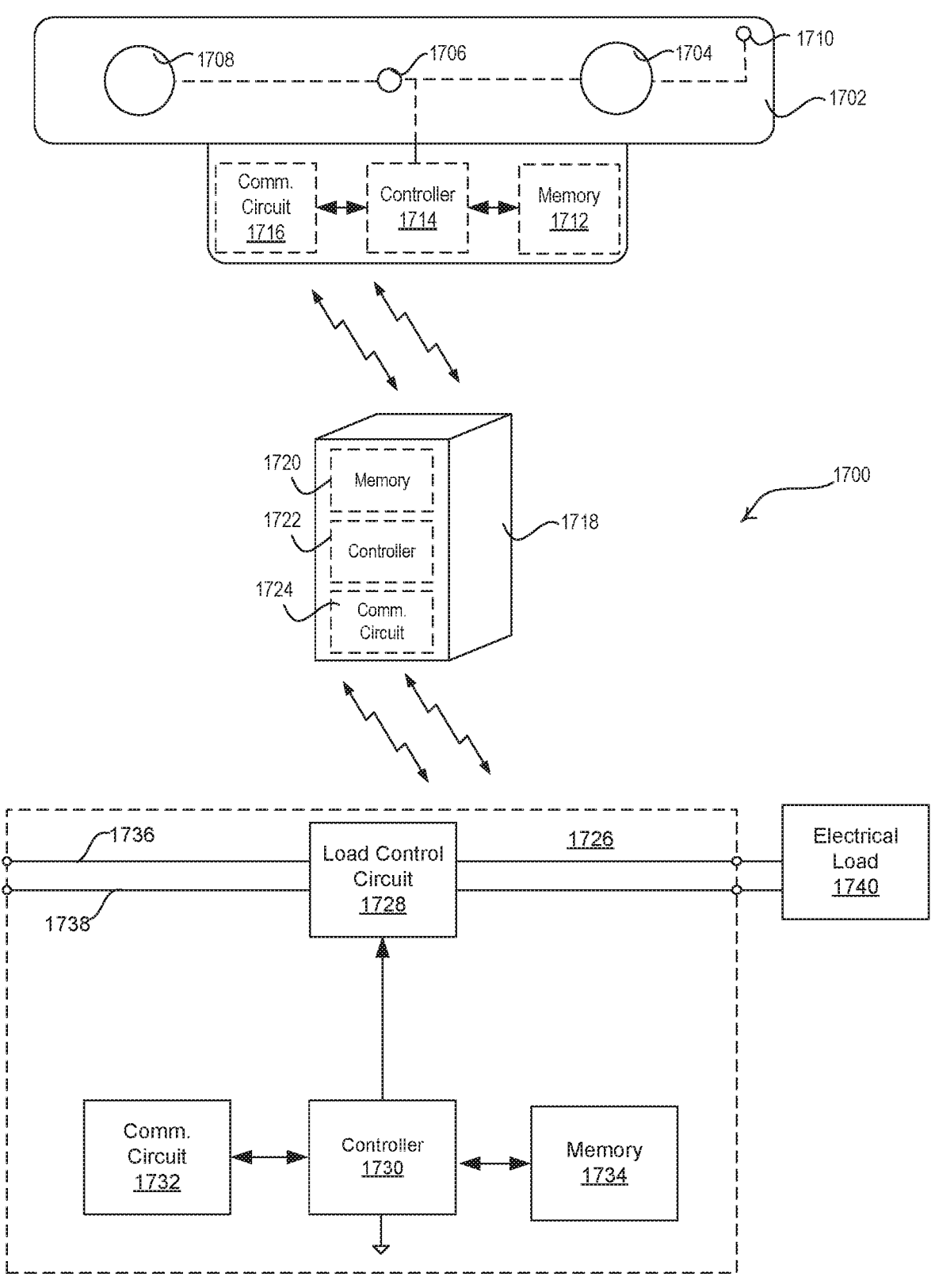
FIG. 17 is a block diagram depicting an example system for performing gesture-based load control.

FIG. 17 is a block diagram depicting an example system 1700 for performing gesture-based load control. As shown in FIG. 17, the system 1700 may include a motion capture device 1702, a gesture-based control device 1718, and/or a load control device 1726. The motion capture device 1702, or the functionality thereof, may be included in the gesture-based control device 1718 or the load control device 1726. The gesture-based control device 1718, or the functionality thereof, may be included in the motion capture device 1702.

The motion capture device 1702 may include any device capable of capturing images (e.g., still-frame images and/or videos) of a user or a user environment. The motion capture device 1702 may include a control circuit, e.g., controller 1714, for controlling the functionality of the motion capture device 1702. The controller 1714 may include one or more general purpose processors, special purpose processors, conventional processors, digital signal processors (DSPs), microprocessors, integrated circuits, a programmable logic device (PLD), application specific integrated circuits (ASICs), or the like. The controller 1714 may perform signal coding, data processing, image processing, power control, input/output processing, or any other functionality that enables the motion capture device 1702 to perform as described herein.

The controller 1714 may store information in and/or retrieve information from the memory 1712. The memory 1712 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The motion capture device 1702 may communicate with the gesture-based control device 1718 and/or load control device 1726 via a communication circuit 1716. The communication circuit 1716 may be capable of performing wired and/or wireless communications. The communication circuit 1716 may include an RF transceiver for transmitting and receiving RF signals via an antenna or other communications module capable of performing wireless communications. The communication circuit 1716 may be in communication with controller 1714. The communication circuit 1716 may be capable of performing communications via different communication channels. For example, the communication circuit 1716 may be capable of communicating via WI-FI®, WIMAX®, BLUETOOTH®, near field communication (NFC), a proprietary communication protocol, such as CLEAR CONNECT™, ZIGBEE®, Z-WAVE, or the like. The communication circuit 1716 may comprise an RF transmitter for transmitting RF signals, an RF receiver for receiving RF signals, an IR transmitter for transmitting IR signals, or an IR receiver for receiving IR signals.

The controller 1714 may be in communication with a digital camera 1704, an infrared (IR) camera 1708, a depth sensor 1706, and/or an indicator light 1710. The digital camera 1704 may generate images using visible light. The IR camera 1708 may generate images using IR radiation. The controller may use images from an RGB camera (not shown), such as for performing facial recognition of a user. The controller may use one or more microphones (not shown) for capturing audio. The depth sensor 1706 may be used to capture the three-dimensional (3D) aspects of the images. The depth sensor 1706 may include an IR laser for capturing the distance between the motion capture device 1702 and another device. The indicator light 1710 may turn on and/or off to provide indications to a user, such as whether the motion capture device 1704 is on or off, whether a gesture has been identified, whether the gesture-based control device 1718 has been enabled, whether the gesture-based control device 1718 is in a programming mode, or the like.

The gesture-based control device 1718 may include a control circuit, e.g., controller 1722, for controlling the functionality of the gesture-based control device 1718. The controller 1722 may include one or more general purpose processors, special purpose processors, conventional processors, digital signal processors (DSPs), microprocessors, integrated circuits, a programmable logic device (PLD), application specific integrated circuits (ASICs), or the like. The controller 1722 may perform signal coding, data processing, image processing, power control, input/output processing, or any other functionality that enables the gesture-based control device 1718 to perform as described herein.

The controller 1722 may store information in and/or retrieve information from the memory 1720. The memory 1720 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The gesture-based control device 1718 may communicate with the motion capture device 1702 and/or the load control device 1726 via a communication circuit 1724. The communication circuit 1724 may include one or more communication circuits. For example, one communication circuit may communicate with the motion capture device 1702 and one communication circuit may communicate with the load control device 1726. The communication circuit 1724 may be capable of performing wired and/or wireless communications. The communication circuit 1724 may include an RF transceiver for transmitting and receiving RF signals via an antenna, or other communications module capable of performing wireless communications. The communication circuit 1724 may be in communication with controller 1722.

The communication circuit 1724 may be capable of performing communications via different communication channels. The communication circuit 1724 may comprise an RF transmitter for transmitting RF signals, an RF receiver for receiving RF signals, an IR transmitter for transmitting IR signals, or an IR receiver for receiving IR signals.

The load control device 1726 may include a dimmer switch, an electronic switch, an electronic ballast for controlling fluorescent lamps, a light-emitting diode (LED) driver for controlling LED light sources, an AC plug-in load control device (e.g., a switching device), a thermostat, a motorized window treatment, or other load control device for controlling an electrical load 1740. The load control device 1726 may include a control circuit, e.g., a controller 1730, and a communication circuit 1732. The communication circuit 1732 may be capable of performing wired and/or wireless communications. The communication circuit 1732 may include an RF transceiver for transmitting and receiving RF signals via an antenna, or other communications module capable of performing wired and/or wireless communications. The communication circuit 1732 may comprise an RF transmitter for transmitting RF signals, an RF receiver for receiving RF signals, an IR transmitter for transmitting IR signals, or an IR receiver for receiving IR signals. The communication circuit 1732 may be in communication with controller 1730. The controller 1730 may include one or more general purpose processors, special purpose processors, conventional processors, digital signal processors (DSPs), microprocessors, integrated circuits, a programmable logic device (PLD), application specific integrated circuits (ASICs), or the like. The controller 1730 may perform signal coding, data processing, image processing, power control, input/output processing, or any other functionality that enables the load control device to perform as described herein.

The controller 1730 may store information in and/or retrieve information from the memory 1734. The memory 1734 may include a non-removable memory and/or a removable memory. The load control circuit 1728 may receive instructions from the controller 1730 and may control the electrical load 1740 (e.g., by controlling the amount of power provided to the load) based on the received instructions. The load control circuit 1728 may receive power via a hot connection 1736 and a neutral connection 1738. While the load control device 1726 includes four terminals as shown in FIG. 17, the load control device 1726 may include one load terminal connected to the electrical load 1740, which may be connected in series between the load control device 1726 and a neutral of the AC power source supplying power to the hot connection 1736 and the neutral connection 1738. In other words, the load control device 1726 may be a "three-wire" device. The load control device 1726 may have one connection to the AC power source (e.g., hot connection 1736) and may not comprise a connection to the neutral of the AC power source (e.g., may not comprise neutral connection 1738). In other words, the load control device 1726 may be a "two-wire" device. The electrical load 1740 may include any type of electrical load.

While the examples described herein may use control instructions to control an electrical load, the control instructions may be identified, associated, programmed, and/or used to control other functions of a load control device. For example, the control instructions may be used to enable or disable a load control device, such as an occupancy sensor, a remote control device, or a timer or other automated function on a load control device that the user may manually override. The control instructions may control occupancy or vacancy status of an occupancy sensor.

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. An electrical load controller, comprising:
audio capture circuitry;
image acquisition circuitry;
memory circuitry; and
control circuitry communicatively coupled to the audio capture circuitry, the image acquisition circuitry, and the memory circuitry, the control circuitry to:
detect a plurality of skeletal data points of a remote user;
determine whether the detected plurality of skeletal data points corresponds to a skeletal structure logically associated with a unique user identity stored in the memory circuitry;
responsive to the determination that the skeletal structure corresponds to a unique user identity stored in the memory circuitry, uniquely identify the remote user;
retrieve from the memory circuitry one or more inputs associated with the uniquely identified remote user;
receive, from the uniquely identified remote user, a selection of one or more load control devices based on a detected movement of a first of the detected plurality of skeletal data points with respect to at least one other of the detected skeletal data points, the input associated with the uniquely identified remote user; and
receive, from the uniquely identified remote user, a physiological input to adjust one or more parameters of at least one of the selected one or more load control devices, the physiological input associated with the uniquely identified remote user.

2. The electrical load controller of claim 1 wherein to receive the physiological input to adjust the one or more parameters of the at least one of the selected one or more load control devices, the control circuitry to further:
detect a movement of a second of the detected plurality of skeletal data points with respect to at least one other of the detected skeletal data points.

3. The electrical load controller of claim 1 wherein to receive the physiological input to adjust the one or more parameters of the at least one of the selected one or more load control devices, the control circuitry to further:
detect one or more facial features of the uniquely identified remote user.

4. The electrical load controller of claim 1:
wherein to receive the physiological input to adjust the one or more parameters of the at least one of the selected one or more load control devices, the control circuitry to further:
receive image data indicative of the physiological input via the image capture circuitry.

5. The electrical load controller of claim 1:
wherein to receive the physiological input to adjust the one or more parameters of the at least one of the selected one or more load control devices, the control circuitry to further:
receive audio data indicative of the physiological input via the audio capture circuitry.

6. An electrical load control method, comprising:
detecting, by control circuitry, a plurality of skeletal data points of a remote user;
determining, by the control circuitry, whether the detected plurality of skeletal data points corresponds to a skeletal structure logically associated with a unique user identity stored in a memory circuitry;
uniquely identifying the remote user responsive to the determination that the skeletal structure corresponds to a unique user identity stored in the memory circuitry;
retrieving from the memory circuitry one or more inputs associated with the uniquely identified remote user;
receiving, by the control circuitry disposed in an electrical load controller, a selection of one or more load control devices based on a detected movement of a first of the detected plurality of skeletal data points with respect to at least one other of the detected skeletal data points, the input associated with the uniquely identified remote user; and
receiving, by the control circuitry, a physiological input to adjust one or more parameters of at least one of the selected one or more load control devices, the physiological input associated with the uniquely identified remote user.

7. The method of claim 6 wherein receiving the physiological input to adjust the one or more parameters of the at least one of the selected one or more load control devices, further comprises:
detecting, by the control circuitry, movement of a second of the detected plurality of skeletal data points with respect to at least one other of the detected skeletal data points.

8. The method of claim 6 wherein receiving the physiological input to adjust the one or more parameters of the at least one of the selected one or more load control devices, further comprises:
detecting by the control circuitry, one or more facial features of the uniquely identified remote user.

9. The method of claim 6:
wherein receiving physiological input to adjust the one or more parameters of the at least one of the selected one or more load control devices, further comprises:
receiving, by the control circuitry, image data indicative of the physiological input via communicatively coupled image capture circuitry.

10. The method of claim 6:
wherein receiving physiological input to adjust the one or more parameters of the at least one of the selected one or more load control devices, further comprises:
receiving, by the control circuitry, audio data indicative of the physiological input via communicatively coupled audio capture circuitry.

11. A non-transitory, machine-readable, storage device that includes instructions that, when executed by control circuitry disposed in an electrical load controller, cause the control circuitry to:

detect a plurality of skeletal data points of a remote user;

determine whether the detected plurality of skeletal data points corresponds to a skeletal structure logically associated with a unique user identity stored in a memory circuitry;

uniquely identify the remote user responsive to the determination that the skeletal structure corresponds to a unique user identity stored in the memory circuitry;

retrieve from the memory circuitry one or more inputs associated with the uniquely identified remote user;

receive a selection of one or more load control devices based on a detected movement of a first of the detected plurality of skeletal data points with respect to at least one other of the detected skeletal data points, the input associated with the uniquely identified remote user; and receive a physiological input to adjust one or more parameters of at least one of the selected one or more load control devices, the physiological input associated with the uniquely identified remote user.

12. The non-transitory, machine-readable, storage device of claim 11 wherein the instructions that cause the control circuitry to receive the physiological input to adjust the one or more parameters of the at least one of the selected one or more load control devices, further cause the control circuitry to:

detect a movement of a second of the detected plurality of skeletal data points with respect to at least one other of the detected skeletal data points.

13. The non-transitory, machine-readable, storage device of claim 11 wherein the instructions that cause the control circuitry to receive the physiological input to adjust the one or more parameters of the at least one of the selected one or more load control devices, further cause the control circuitry to:

detect one or more facial features of the uniquely identified remote user.

14. The non-transitory, machine-readable, storage device of claim 11:

wherein the instructions that cause the control circuitry to receive the physiological input to adjust the one or more parameters of the at least one of the selected one or more load control devices, further cause the control circuitry to:

receive image data indicative of the physiological input via communicatively coupled image capture circuitry.

15. The non-transitory, machine-readable, storage device of claim 11:

wherein the instructions that cause the control circuitry to receive the physiological input to adjust the one or more parameters of the at least one of the selected one or more load control devices, further cause the control circuitry to:

receive audio data indicative of the physiological input via communicatively coupled audio capture circuitry.

* * * * *